(12) United States Patent
Borntraeger et al.

(10) Patent No.: US 9,291,243 B2
(45) Date of Patent: Mar. 22, 2016

(54) POWERSHIFT TRANSMISSION FOR A MOTOR VEHICLE AND METHOD FOR CONTROLLING A POWERSHIFT TRANSMISSION

(71) Applicant: ZF Friedrichshafen AG, Friedrichshafen (DE)

(72) Inventors: Kai Borntraeger, Langenargen (DE); Bernard Hunold, Friedrichshafen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 54 days.

(21) Appl. No.: 14/247,288

(22) Filed: Apr. 8, 2014

(65) Prior Publication Data
US 2014/0329633 A1 Nov. 6, 2014

(30) Foreign Application Priority Data

May 6, 2013 (DE) .......................... 10 2013 208 201

(51) Int. Cl.
| | |
|---|---|
| *F16H 47/02* | (2006.01) |
| *F16H 1/28* | (2006.01) |
| *F16H 3/00* | (2006.01) |
| *F16H 3/08* | (2006.01) |
| *F16H 47/04* | (2006.01) |

(52) U.S. Cl.
CPC .................. *F16H 1/28* (2013.01); *F16H 3/006* (2013.01); *F16H 47/02* (2013.01); *F16H 47/04* (2013.01); *F16H 2003/008* (2013.01); *F16H 2003/0818* (2013.01); *Y10T 74/19228* (2015.01)

(58) Field of Classification Search
CPC ... F16H 3/006; F16H 47/02; F16H 2003/008; F16H 47/04; F16H 2003/0818; Y10T 74/19228
See application file for complete search history.

(56) References Cited

U.S. PATENT DOCUMENTS

| | | | | |
|---|---|---|---|---|
| 6,044,728 | A | * | 4/2000 | Pecceu .......................... 74/730.1 |
| 7,056,264 | B2 | | 6/2006 | Kupper et al. |
| 7,361,111 | B2 | * | 4/2008 | Aitzetmueller et al. ........ 475/83 |

(Continued)

FOREIGN PATENT DOCUMENTS

| | | |
|---|---|---|
| DE | 10 2004 005 789 A1 | 8/2004 |
| DE | 10 2006 036 758 A1 | 2/2008 |
| DE | 10 2008 040 444 | * 1/2010 |

*Primary Examiner* — Sherry Estremsky
(74) *Attorney, Agent, or Firm* — Davis & Bujold, P.L.L.C.; Michael J. Bujold

(57) ABSTRACT

A motor vehicle powershift transmission which comprising two partial transmissions (TG1, TG2) each with a respective input shaft (GE1, GE2) that can be drivingly connected, via a main separator clutch (CL1, CL2; CL1', CL2'; CL1*, CL2*), with the driveshaft (TW) of a drive engine (VM) and, on the output side, with a common output shaft (GA). To enable powershifts without frictional slipping, the two input shafts (GE1, GE2), on the input side, can be connected to and disconnected from a respective intermediate shaft (ZW1, ZW2) by the respective main separator clutch (CL1, CL2; CL1', CL2'; CL1*, CL2*). The first intermediate shaft (ZW1) is directly connected to the driveshaft (TW) and the second intermediate shaft (ZW2) is in driving connection with the first intermediate shaft (ZW1) by way of a variator (V) which has a continuously adjustable transmission ratio ($i_V$) and a rest transmission ratio having the value one $i_{V\_0}=1$).

31 Claims, 23 Drawing Sheets

(56) References Cited

U.S. PATENT DOCUMENTS

| | | | |
|---|---|---|---|
| 8,808,131 B2 * | 8/2014 | Seipold et al. | 475/219 |
| 8,882,623 B2 * | 11/2014 | Mutschler et al. | 475/72 |
| 2012/0125730 A1 * | 5/2012 | Moloney | 192/48.1 |

* cited by examiner

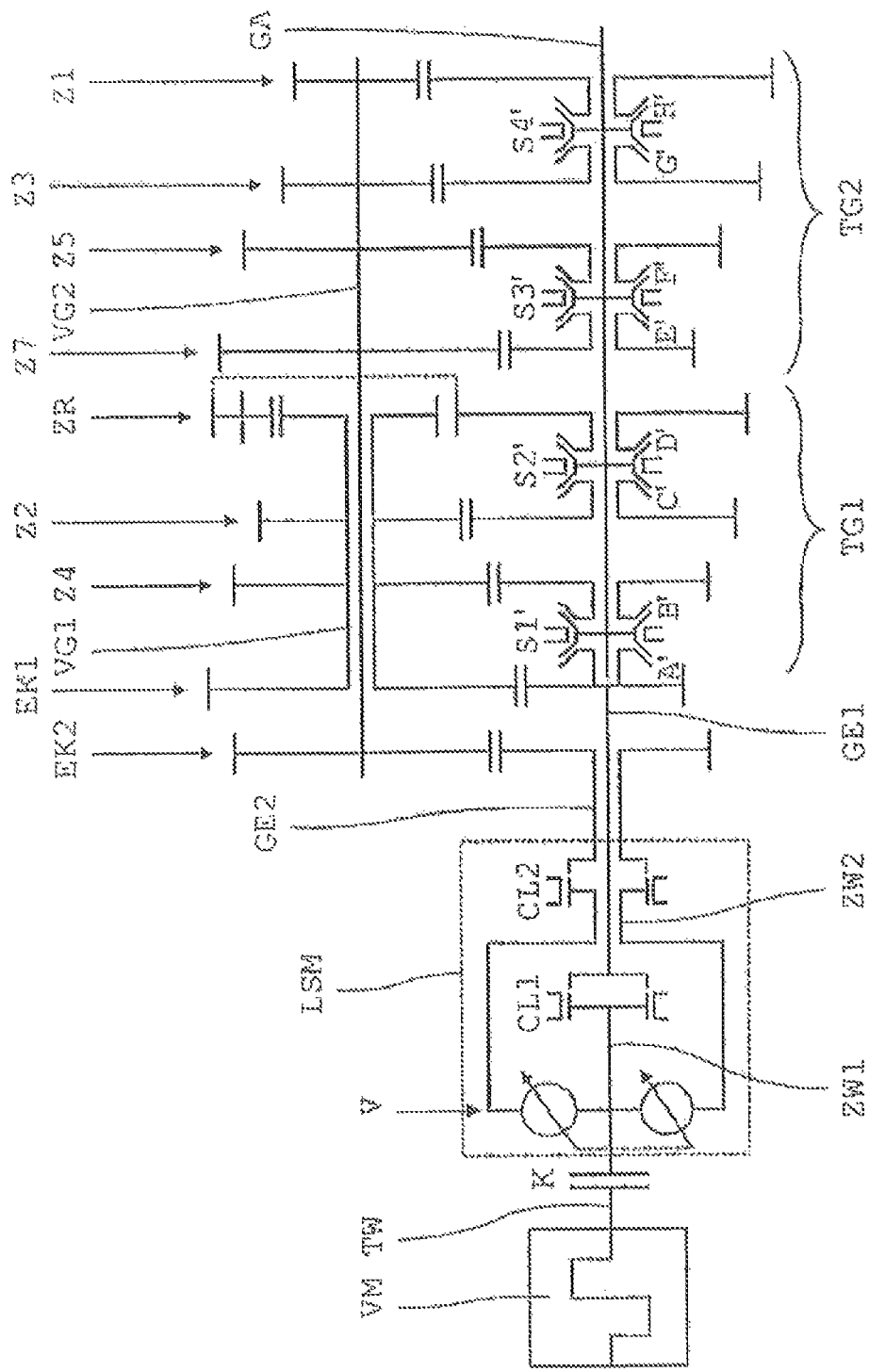

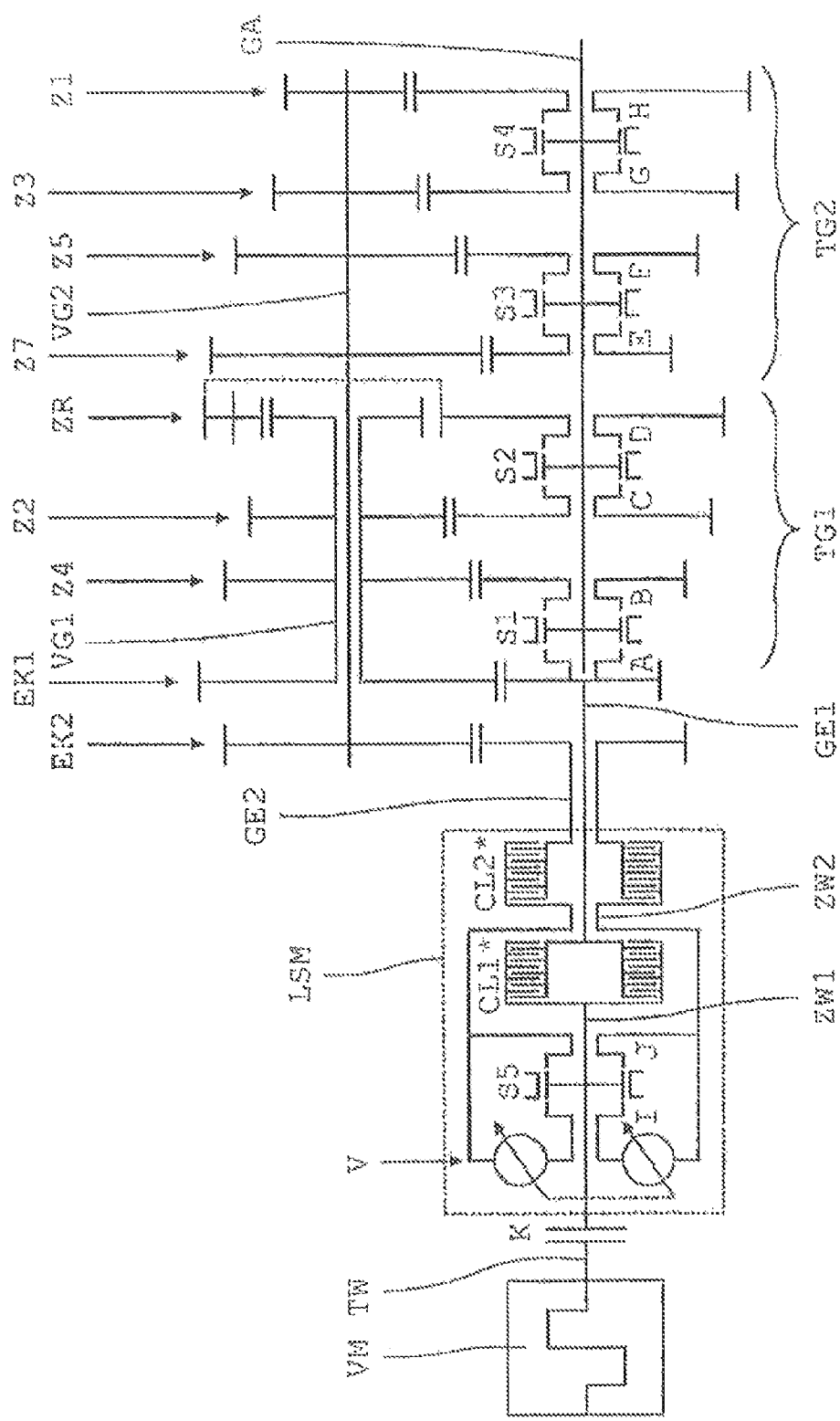

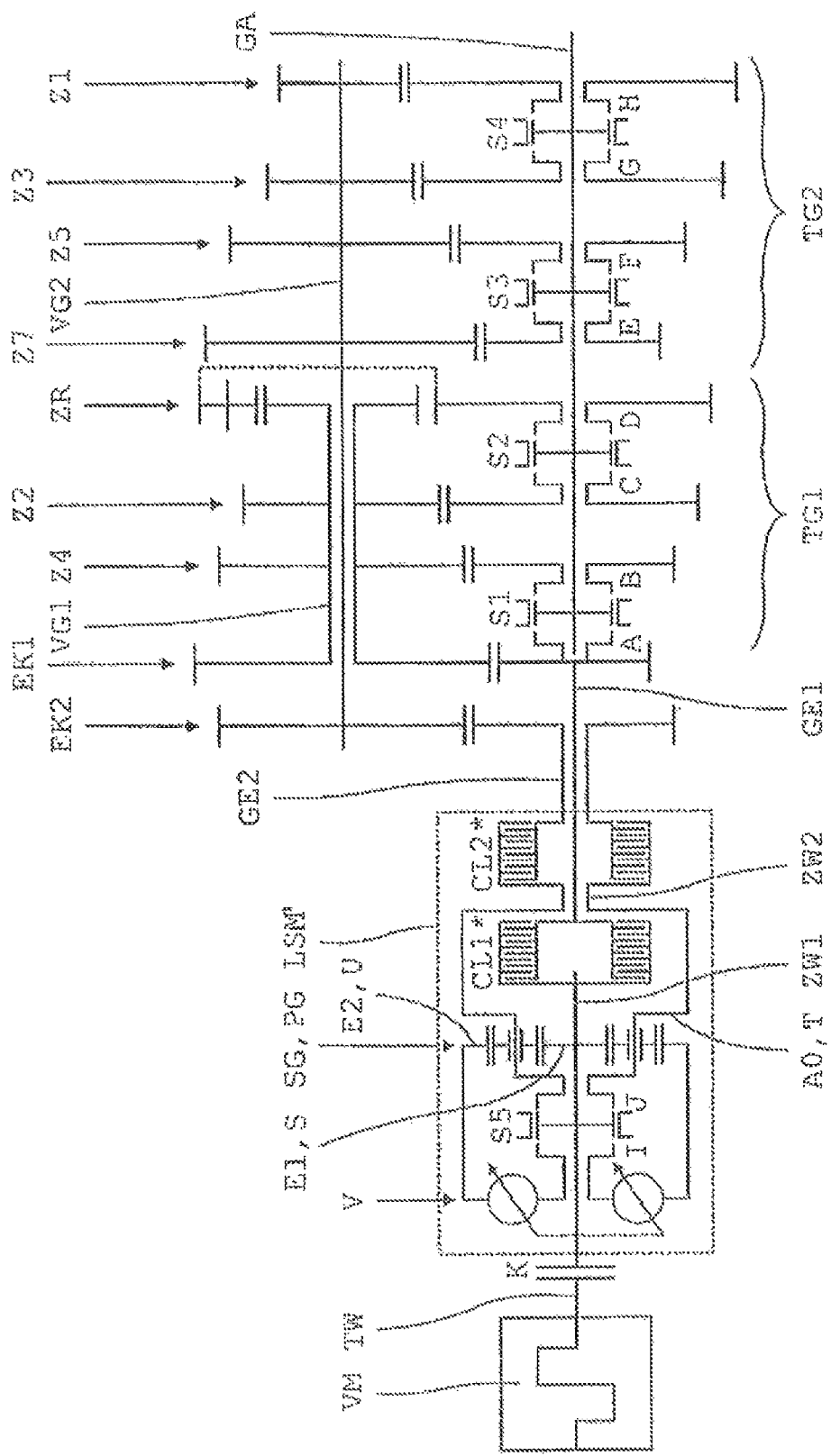

POWERSHIFT TRANSMISSION FOR A MOTOR VEHICLE AND METHOD FOR CONTROLLING A POWERSHIFT TRANSMISSION

This application claims priority from German patent application serial no. 10 2013 208 201.0 filed May 6, 2013.

FIELD OF THE INVENTION

The invention concerns a powershift transmission of a motor vehicle, comprising two partial transmissions each with an input shaft, each of which can be brought into driving connection on the input side, via a main separator clutch, with the driveshaft of a drive engine and on the output side, by way of plurality of selectively engaged gear steps that have different gear ratios, with a common output shaft. The invention also concerns a method for controlling shifts in a powershift transmission of that type.

BACKGROUND OF THE INVENTION

A powershift transmission is understood to be a variable-speed transmission in which a gearshift takes place under load, i.e. with no interruption of the force transfer between the driveshaft of the drive engine and the output shaft of the transmission. During this, the force flow in a gearshift is transmitted by the actuation of frictional shifting elements from a currently load-bearing force transmission branch with a current, actual gear ratio, by operating with slip for a short time, continuously to a parallel force transmission branch with a target gear ratio. Known structures for powershift transmissions are the planetary automatic transmission and the dual clutch transmission.

In a planetary automatic transmission the shift-related force transmission transfer takes place by the actuation of transmission-internal frictional shifting elements such as shifting clutches and shifting brakes, in that with time overlap, at least one friction shifting element that is load-carrying when the loaded gear is engaged, is opened, and at least one friction shifting element that carries the load when the target gear is engaged, is closed.

In a dual clutch transmission the shift-related force transmission transfer takes place by actuating the transmission-external friction clutches arranged between the driveshaft of the drive engine and, respectively, one of the two input shafts, in that first the target gear is engaged in the partial transmission that is not carrying the load and then, with time overlap, the friction clutch associated with the gear under load is opened and the friction clutch associated with the input shaft of the target gear is closed. The typical structure of a dual clutch transmission and a method for controlling shifts in a dual clutch transmission, in which a traction upshift takes place without any electronic action in the engine control system, can be seen in DE 10 2004 005 789 A1.

The disadvantages of shifting processes in the known powershift transmissions are, for one, the need to operate with frictional slip during the phase of force transfer from the force transmitting branch containing the initially loaded gear to the force transmitting branch containing the target gear. The frictional slip in the friction shifting elements or friction clutches dissipates drive energy, i.e. converts it into heat. Likewise, the frictional slip necessarily results in wear of the friction linings of the friction shifting elements and clutches concerned. The dissipation of drive energy increases the fuel consumption of the motor vehicle concerned, and wear on the friction lining limits the useful life of the powershift transmission.

To avoid these disadvantages, in DE 10 2006 036 758 A1 a dual clutch transmission is proposed, in which the input shafts of the two partial transmissions can in each case be connected in a rotationally fixed manner to the driveshaft of the drive engine in each case by means of a main separator clutch in the form of an unsynchronized claw clutch. In that case, as starting and synchronization means two electric machines are provided, each of them in driving connection with one of the two input shafts. Alternatively a single electric machine can also be provided, which can be brought into driving connection with one or other of the two input shafts in alternation by means of a shifting mechanism. It is true that this design of a dual clutch transmission does avoid slipping operation of the otherwise common friction clutches. However, the disadvantage of a dual clutch transmission of such a design is the high outfitting cost of the two electric machines or of the one electric machine together with the shifting mechanism, as well as at least one electrical energy accumulator and the associated control technology.

SUMMARY OF THE INVENTION

Accordingly, the purpose of the present invention is to propose a powershift transmission of the structural type mentioned earlier, in which during a gearshift between two gears of the two partial transmissions, slipping operation of the otherwise common friction clutches can be avoided with relatively little outfitting cost. In addition, a method for controlling shifts in such a powershift transmission is indicated.

Accordingly, the invention concerns a powershift transmission for a motor vehicle which comprises two partial transmissions, each of which can be brought into driving connection on the input side, via a main separator clutch, with the driveshaft of a drive engine and on the output side, by way of a plurality of selectively engaged gear steps with different gear ratios, with a common drive output shaft. In this powershift transmission it is provided that the two input shafts on the input side can be connected by the respective main separator clutch to an associated intermediate shaft and can be disconnected therefrom, and that the first intermediate shaft is connected directly in a rotationally fixed manner to the driveshaft of the engine, while in contrast the second intermediate shaft is in driving connection with the first intermediate shaft by way of a variator V with a continuously adjustable transmission ratio $i_V$ and a ratio at rest that has the value one ($i_{V\_0}=1$).

Thus, the invention starts from a powershift transmission comprising two partial transmissions TG1, TG2 each with a respective input shaft GE1, GE2, which can in each case be brought into driving connection on the input side, via a main separator clutch CL1, CL2, with the driveshaft TW of a drive engine VM and on the output side, by way of a plurality of selectively engaged gear steps (G1 to G7, R) that have different gear ratios, with a common output shaft GA.

Accordingly, the structure of this powershift transmission corresponds in large measure to that of a dual clutch transmission known per se. However, the difference from a dual clutch transmission is that instead of the therein customary friction clutches arranged between the driveshaft TW of the drive engine VM and the input shafts GE1, GE2, it is provided that on the input side the two input shafts GE1, GE2 can be connected by their respective main separator clutches CL1, CL2 to an associated intermediate shaft ZW1, ZW2 and disconnected therefrom. The first intermediate shaft ZW1 is connected directly and rotationally fixed to the driveshaft TW of the drive engine VM, whereas in contrast the second intermediate shaft ZW2 is in driving connection with the first intermediate shaft ZW1, via a variator V, with a continuously adjustable transmission ratio $i_V$ and a ratio at rest with the value one ($i_{V\_0}=1$). A starting clutch K is preferably arranged on the driveshaft TW of the engine VM. In a known way, the variator V can for example be in the form of a conical wrap-round transmission or a toroidal transmission.

Thus, by means of the variator the rotational speeds $n_{ZW1}$, $n_{ZW2}$ of the two intermediate shafts ZW1, ZW2 can be changed relative to one another. This makes it possible, during a shifting process carried out as a powershift from an initially loaded gear (G2, G4, G6) of the first partial transmission TG1 to a target gear (G1, G3, G5, G7) of the second partial transmission TG2, by appropriate adjustment of the variator V, to synchronize both the main separator clutch CL2 arranged between the second intermediate shaft ZW2 and the second input shaft GE2, and also the gear clutch (E, F, G, H) of the target gear. Likewise this makes it possible, during a shifting process carried out as a powershift from an initially loaded gear (G1, G3, G5, G7) of the second partial transmission TG2 to a target gear (G2, G4, G6) of the first partial transmission TG1, by appropriate adjustment of the variator V as well as by simultaneous rotational speed adaptation of the drive engine VM, to synchronize both the main separator clutch CL1 arranged between the first intermediate shaft ZW1 and the first input shaft GE1 and also the gear clutch (A, B, C) of the target gear. It is therefore possible for both of the main separator clutches CL1, CL2 and also the gear clutches (A to H) to be designed inexpensively as unsynchronized claw clutches.

With the powershift transmission according to the invention, compared with a dual clutch transmission the shift-related friction slip operation of the friction clutches on the input side, and compared with a powershift transmission known from DE 10 2006 036 758 A1 the expenditure for additional electric machines and their supply and control systems, are avoided.

The two main separator clutches CL1, CL2, the two intermediate shafts ZW1, ZW2 and the variator V are preferably combined in a preassembled powershift module LSM. On the one hand this simplifies the assembly of the powershift transmission. On the other hand it provides the possibility of using the same basic transmission in combination with the powershift module LSM, as a powershift transmission according to the invention, or in combination with two friction clutches on the input side, which can be combined in a dual clutch module, as a dual clutch transmission.

A second embodiment of the powershift transmission according to the invention is characterized in that on the input side the two input shafts GE1, GE2 can be connected and disconnected by means of their respective main separator clutches CL1, CL2, to and from an associated intermediate shaft ZW1, ZW2, and that the first intermediate shaft ZW1 is connected directly and in a rotationally fixed manner to the driveshaft TW of the engine VM, whereas the second intermediate shaft ZW2 is in driving connection with the first intermediate shaft ZW1 by way of a variator V having a continuously adjustable transmission ratio $i_V$ and a gear ratio at rest having the value one ($i_{V\_0}=1$), and by way of a superposition gearset SG with two input elements E1, E2 and an output element A0, wherein the first input element E1 is connected directly and rotationally fixed to the first intermediate shaft ZW1, the second input element E2 is in driving connection via the variator V with the first intermediate shaft ZW1, and the output element A0 is connected in a rotationally fixed manner to the second intermediate shaft ZW2.

The structure of this second embodiment of the powershift transmission differs from the first embodiment in that the two intermediate shafts ZW1, ZW2 are not in driving connection with one another directly via the variator V. Rather, in this case the driving connection of the two intermediate shafts ZW1, ZW2 has two parallel force transmission branches connected to the first intermediate shaft ZW1, one of which contains the variator V, and which are merged in the superposition gearset SG whose output element A0 is connected to the second intermediate shaft ZW2 in a rotationally fixed manner. This configuration has the advantage that force transmission when the second partial transmission TG2 is carrying the load (loaded gear G1, G3, G5 or G7) takes place only partially by way of the variator V, which results in higher efficiency. However, a disadvantage of this is that in this case its transmission ratio $i_V$ must have a larger adjustment range in order to be able to produce a given rotational speed difference between the two intermediate shafts ZW1, ZW2. However, the principle of the mode of operation of this second embodiment of the powershift transmission according to the invention corresponds to that of the first embodiment.

To achieve a compact and at the same time robust structure, the superposition gearset SG is preferably made in the form of a simple planetary gearset PG with a sun gear S, a planetary carrier T carrying a plurality of planetary gearwheels and a ring gear U, in which the sun gear S is the first input element E1, the ring gear U is the second input element E2 and the planetary carrier T is the output element A0.

Alternatively, the superposition gearset SG can also be in the form of a simple planetary gearset PG with a sun gear S, a planetary carrier T carrying a plurality of planetary gearwheels and a ring gear U, in which the ring gear U is the first input element E1, the sun gear S is the second input element E2 and the planetary carrier T is the output element A0.

For the reasons mentioned earlier, with this second embodiment of the powershift transmission according to the invention it is also advantageous for the two main separator clutches CL1, CL2, the two intermediate shafts ZW1, ZW2, the variator V and the superposition gearset SG to be combined in a pre-assembled powershift module LSM'.

A third embodiment of the powershift transmission according to the invention is characterized in that on the input side, the two input shafts GE1, GE2 can be connected to or disconnected from an associated intermediate shaft ZW1, ZW2 by means of their respective main separator clutch CL1, CL2, and the two intermediate shafts ZW1, ZW2 are directly in driving connection with one another via a variator V with a continuously adjustable transmission ratio $i_V$ and a ratio at rest which has the value one ($i_{V\_0}=1$), and in driving connection by way of a transfer box VG having an input element E0 and two output elements A1, A2, with the driveshaft TW of the drive engine VM, wherein the input element E0 is connected in a rotationally fixed manner to the driveshaft TW of the engine VM, the first output element A1 is connected in a rotationally fixed manner to the first intermediate shaft ZW1 and the second output element A2 is connected in a rotationally fixed manner to the second intermediate shaft ZW2.

The structure of this third embodiment of the powershift transmission according to the invention differs from the first and second embodiments in that although the two intermediate shafts ZW1, ZW2 are directly in driving connection with one another via the variator V as in the first embodiment, neither of the two intermediate shafts ZW1, ZW2 is directly connected to the driveshaft TW of the engine VM. Rather, in this case the two intermediate shafts ZW1, ZW2 are in driving connection with one another and with the driveshaft TW of the engine VM by way of the transfer box VG. As in the second embodiment, in relation to the second partial transmission TG2 this has the advantage that when the first partial transmission TG1 is carrying the load (loaded gear G2, G4, G6 or R) and when the second partial transmission TG2 is carrying the load (loaded gear G1, G3, G5 or G7), in each case the force transmission takes place only partially by way of the variator V, which results in higher efficiency. On the other hand, to set a given rotational speed difference between the two intermediate shafts ZW1, ZW2 the variator V does not need a larger adjustment range, since it is arranged immediately between the two intermediate shafts ZW1, ZW2.

A disadvantage of this third embodiment can be considered to be that due to the coupling of the intermediate shafts ZW1, ZW2 to the driveshaft TW of the drive engine VM by way of the transfer box VG, any transmission ratio adjustment of the variator V is necessarily accompanied by a change of the engine rotational speed $n_{VM}$, i.e. it necessitates an adaptation of the rotational speed of the drive engine VM. In other respects the mode of operation of this third embodiment of the powershift transmission according to the invention corresponds in large measure to those of the first and second embodiments.

To achieve a compact and at the same time robust structure, the transfer box VG is preferably in the form of a simple planetary gearset PG with a sun gear S, a planetary carrier T that carries a plurality of planetary gearwheels and a ring gear U, in which the planetary carrier T is the input element E0, the sun gear S is the first output element A1 and the ring gear U is the second output element A2.

Alternatively, the transfer box VG can also be made as a simple planetary gearset PG with a sun gear S, a planetary carrier T carrying a plurality of planetary gearwheels and a ring gear U, in which the planetary carrier T is the input element E0, the ring gear U is the first output element A1 and the sun gear S is the second output element A2.

For the reasons mentioned earlier, it is also advantageous in this third embodiment of the powershift transmission according to the invention for the two main separator clutches CL1, CL2, the two intermediate shafts ZW1, ZW2, the variator V and the transfer box to be structurally combined in a pre-assembled powershift module LSM*.

Since in the first and third embodiments of the powershift transmission according to the invention the two intermediate shafts ZW1, ZW2 are directly in driving connection with one another by way of the variator V, in this case the variator V should have an adjustment range whose highest ratio $i_{V\_max}$ corresponds at least to the maximum gear interval $\phi_{max} = (i_{G\_n}/i_{G\_n+1})_{max}$ of the gears (G1 to G7), and whose lowest ratio $i_{V\_min}$ corresponds at least to the reciprocal of the maximum gear interval $\phi_{max}$ of the gears (G1 to G7) ($i_{V\_max} \geq \phi_{max}$, $i_{V\_min} \leq 1/\phi_{max}$).

Since in the second embodiment of the powershift transmission according to the invention the two intermediate shafts ZW1, ZW2 are only indirectly in driving connection with one another, namely via the superposition gearset and the variator, then assuming a symmetrical structure of the superposition gearset SG the variator V should have an adjustment range whose highest transmission ratio $i_{V\_max}$ corresponds to at least twice the maximum gear interval $2*\phi_{max}$ of the gears (G1 to G7) and whose lowest gear interval corresponds to at least the reciprocal of twice the maximum gear interval $2*\phi_{max}$ of the gears ($i_{V\_max} \geq 2*\phi_{max}$, $i_{V\_min} \leq \frac{1}{2}*\phi_{max}$). If an adjustment range as large as that cannot be realized with a single variator V, then to do this a serial arrangement of more than one variator can be provided.

In order, when no shifting processes are taking place, to avoid a permanent force flow via the variator V and the associated loss of efficiency, it can advantageously be provided that the variator V can be connected to and disconnected from the first intermediate shaft ZW1 by means of a separator clutch and that the two intermediate shafts ZW1, ZW2 can be directly or indirectly connected to and disconnected from one another by means of a bridging clutch J.

Since the two clutches z, J are engaged and disengaged in alternation, the separator clutch I and the bridging clutch J can be combined in a dual shifting element so that compared with a separate arrangement of the clutches I, J one clutch control element can be saved.

The main separator clutches CL1, CL2 are preferably in the form of unsynchronized claw clutches, since they can be synchronized by adjusting the variator V and this type of structure is particularly inexpensive, space-saving and robust.

It is also possible, however, for the main separator clutches to be frictionally synchronized synchronous clutches CL1', CL2' or disk clutches CL1*, CL2*. In that case the main separator clutches (CL1', CL2'; CL1*, CL2*) can also be synchronized as necessary by compressing their frictional elements.

The gear clutches (A to H) for engaging the gears (G1 to G7, R) are also preferably unsynchronized claw clutches, since these too can be synchronized by adjusting the variator V.

Alternatively however, the gear clutches (A' to H') for engaging the gears (G1 to G7, R) can also be made as frictionally synchronized synchronous clutches, so that these too can be synchronized as necessary by compressing their friction elements.

Furthermore, it can be provided that one of the two main separator clutches XA1', CL2'; CL1*, CL2* is in the form of a friction clutch and the other main separator clutch is a claw clutch. This design can exclude any sticking during a variator adjustment for load takeover if the main separator clutch made as a friction clutch is operated with slight slipping.

Finally, as already indicated earlier, in all the aforesaid embodiments it is preferably provided that the driveshaft TW of the drive engine VM is connected to the first intermediate shaft ZW1 by way of a starting clutch K.

A method according to the invention for controlling shifts in a powershift transmission that comprises two partial transmissions TG1, TG2, each with a respective input shaft GE1, GE2, which can be brought into driving connection on the input side with the driveshaft TW of a drive engine VM by means of a main separator clutch (CL1, CL2; CL1', CL2'; CL1*, CL2*) and on the output side, by way of a plurality of selectively engaged gear steps (G1 to G7, R) having different gear ratios, with a common output shaft GA, wherein the two input shafts GE1, GE2 can be connected on the input side by way of the respective main separator clutch (CL1, CL2; CL2'; CL1*, CL2*) to a respective associated intermediate shaft ZW1, ZW2 or disconnected therefrom, wherein the first intermediate shaft ZW1 is connected directly and rotationally fixed to the driveshaft TW of the drive engine VM and the second intermediate shaft ZW2 (in the first embodiment of the powershift transmission) is in driving connection with the first intermediate shaft ZW1 directly, or (in the second embodiment of the powershift transmission) indirectly via a variator V with a continuously adjustable transmission ratio $i_V$, provides that a gearshift carried out as a powershift from an initially loaded gear (for example the fourth gear G4) of the first partial transmission TG1 to a target gear (for example the fifth gear G5) of the second partial transmission TG2, takes place with the following steps:

a) synchronization of the second main separator clutch (CL2, CL2', CL2*) by adjusting the transmission ratio of the variator V, b) engagement of the second main separator clutch (CL2, CL2', CL2*), c) synchronization of the gear clutch (F, F') of the target gear (G5) by adjusting the transmission ratio of the variator V, d) engagement of the gear clutch (F, F') of the target gear (G5), e) load uptake by the second partial transmission TG2 by a slight transmission ratio adjustment of the variator V, f) disengagement of the first main separator clutch (CL1, CL1', CL1*), g) disengagement of the gear clutch (B, B') of the loaded gear (G4), h) rotational speed adaptation of the drive engine VM with simultaneous readjustment of the variator V to its rest transmission ratio ($i_{V\_0}=1$).

In this method, regardless of the structure of the main separator clutches (CL1, CL2; XΛ1', CL2'; CL1*, CL2*) and of the gear clutches (A to H; A' to H') it is provided that during a shift from an initially loaded gear of the first partial transmission TG1 to a target gear of the second partial transmission TG2, here for example an upshift from the fourth gear G4 to the fifth gear G5, both the second main separator clutch (CL2, CL2', CL2*) and the gear clutch (F, F') of the target gear (G5) are in each case synchronized by appropriate adjustment of the variator V (process steps a and c). For the load uptake by the second partial transmission TG2 the two intermediate shafts ZW1, ZW2 are then braced relative to one another by a slight ratio adjustment of the variator V in the direction toward a higher transmission ratio $i_V$ (process step e), whereby the first main separator clutch (CL1, CL1', CL1*) and the first input shaft GE1 are relieved of the load from the transmitted engine torque $M_{VM}$ of the drive engine VM and the second main separator clutch (CL2, CL2', CL2*) and the second input shaft GE2 take up the bad of the transmitted engine torque $M_{VM}$ of the engine VM.

When at least the second main separator clutch (CL2', CL2*) is a frictionally synchronized synchronous clutch or a disk clutch, the process step a) can be replaced by the following step:

a*) synchronization of the second main separator clutch (CL2', CL2*) by means of the friction elements of the second main separator clutch (CL2', CL2*).

In that case the second input shaft GE2, which before the shifting process is not mechanically connected to the second intermediate shaft ZW2 and the output shaft GA and which rotates relatively slowly under the action of the active drag torques, is accelerated by the compression of the friction elements of the second main separator clutch (CL2', CL2*) until it reaches the synchronous rotational speed. For this, no ratio adjustment of the variator V is needed. Thereafter, the second main separator clutch (CL2', CL2*) is engaged if in the form of a synchronous clutch (CL2') or closed by compression if in the form of a disk clutch (CL2*) (process step b).

If the gear clutches (A' to H') for engaging the gear steps (G1 to G7, R) are made as frictionally synchronized synchronous clutches, the process steps a) to d) can also be replaced by the following steps:

a') synchronization of the gear clutch (F') of the target gear (G5) by the friction elements of the gear clutch (F'), b') engagement of the gear clutch (F') of the target gear (G5), c') synchronization of the second main separator clutch (CL2, CL2', CL2*) by adjusting the transmission ratio of the variator V, d') engagement of the second main separator clutch (CL2, CL2', CL2*).

In that case the second input shaft GE2 is first accelerated due to the pressure of the friction elements of the gear clutch (F') of the target gear (G5) until it reaches the synchronous rotational speed and the gear clutch (F') is then engaged (process steps a' and b'). For this, no ratio adjustment of the variator V is needed. Thereafter, the second main separator clutch (CL2, CL2', CL2*) is synchronized by an appropriate transmission ratio adjustment of the variator V and then engaged (process steps c' and d'). Compared with the first two method variants, the sequence of synchronizing the second main separator clutch (CL2, CL2', CL2*) and the gear clutch (F') of the target gear (G5) is therefore reversed.

Since in the first and second embodiments of the powershift transmission according to the invention the first intermediate shaft ZW1 is in each case indirectly connected in a rotationally fixed manner to the driveshaft TW of the drive engine VIM, the gearshift from an initially loaded gear of the second partial transmission TG2 to a target gear of the first partial transmission TG1 cannot take place as described previously. Consequently, it is provided for this that a gearshift carried out as a powershift, from an initially loaded gear (for example gear G5) of the first partial transmission TG1 to a target gear (for example G6) of the second partial transmission TG2 takes place by the following steps:

i) synchronization of the first main separator clutch (CL1, CL1', CL1*) by a ratio adjustment of the variator V at the same time as a rotational speed adaptation of the drive engine VM, j) engagement of the first main separator clutch (CL1, CL1', CL1*), k) synchronization of the gear clutch (A, A') of the target gear (G6) by adjusting the transmission ratio of the variator V and at the same time adapting the rotational speed of the drive engine VM, l) engagement of the gear clutch (A, A') of the target gear (G6), m) load uptake by the first partial transmission TG1 by a slight ratio adjustment of the variator V, n) disengagement of the second main separator clutch (CL2, CL2', CL2*), o) disengagement of the gear clutch (F, F') of the loaded gear (G5), p) resetting of the variator V to its rest transmission ratio ($i_{V\_0}=1$).

In this method, regardless of the structure of the main separator clutches (CL1, CL2; CL1', CL2'; CL1*, CL2*) and of the gear clutches (A to H; A' to H') it is provided that during a shift from an initially loaded gear of the second partial transmission TG2 to a target gear of the first partial transmission TG1, here for example an upshift from the fifth gear G5 to the sixth gear G6, both the first main separator clutch (CL1, CL1', CL1*) and the gear clutch (A, A') of the target gear (G6) are each synchronized by an appropriate transmission ratio adjustment of the variator V, and at the same time the rotational speed of the drive engine VM is adapted (process steps i and k). In the context of the invention it goes without saying that the rotational speed adaptation of the drive engine VM is carried out as much as possible so as to avoid a collapse of the torque at the output shaft GA, i.e. the engine power, or product of the engine torque $M_{VM}$ and engine speed $n_{VM}$, is kept constant ($M_{VM}*n_{VM}$=const.) during the adaptation.

For the first partial transmission TG1 to take up the load, the two intermediate shafts ZW1, ZW2 are then braced relative to one another by a slight ratio adjustment of the variator V in the direction toward a lower transmission ratio $i_V$ (process step m), whereby the second main separator clutch (CL2, CL2', CL2*) and the second input shaft GE2 are relieved of the transmitted engine torque $M_{MV}$ of the drive engine VM, whereas the first main separator clutch (CL1, CL1', CL1*) and the first input shaft GE1 are loaded by uptake of the transmitted engine torque $M_{VM}$ of the drive engine VM.

When at least the first main separator clutch (CL1', CL1*) is in the form of a frictionally synchronized synchronous clutch or disk clutch, the process step i) can also be replaced by the following step:

i*) synchronization of the first main separator clutch (CL1', CL1*) by means of the friction elements of the first main separator clutch (CL1', CL1*).

In that case the first input shaft GE1, which before the shifting operation is not mechanically connected to the first intermediate shaft ZW1 and to the output shaft GA and which rotates relatively slowly under the action of active drag torques, is accelerated by the compression of the friction elements of the first separator clutch (CL', CL1*) until it reaches the synchronous rotational speed. For this, no ratio adjustment of the variator V is needed. Then the first main separator clutch (CL1', CL1*), if it is in the form of a synchronous clutch (CL'), is engaged, and if it is a disk clutch (CL1*) it is closed by compression (process step j).

If the gear clutches (A' to H') for engaging the gear steps (G1 to G7, R) are frictionally synchronized synchronization clutches, then process steps i) to l) can also be replaced by the following steps:

i') synchronization of the gear clutch (A') of the target gear (G6) by means of the friction elements of the gear clutch (A') of the target gear (G6), j') engagement of the gear clutch (A') of the target gear (G6), k') synchronization of the first main separator clutch (CL1, CL1', CL1*) by adjusting the transmission ratio of the variator V and at the same time adapting the rotational speed of the drive engine VM, l') engagement of the first main separator clutch (CL1, CL1', CL1*).

In that case the first input shaft GE1 is first accelerated by compressing the friction elements of the gear clutch (A') of the target gear (G6) until it reaches the synchronous speed and the gear clutch (A') is then engaged (process steps i') and j')). For this, no ratio adjustment of the variator V is needed. Thereafter the first main separator clutch (CL1, CL1', CL1*) is synchronized by an appropriate transmission ratio adjustment of the variator V in combination with a corresponding rotational speed adaptation of the drive engine VM, and is then engaged (process steps k' and l'). Thus, compared with the two previously described method variants the synchronization sequence of the first main separator clutch (CL1, CL1', CL1*) and the gear clutch (A') of the target gear (G6) is reversed.

Since in the third embodiment of the powershift transmission according to the invention the two intermediate shafts ZW1, ZW2 are respectively in driving connection with the driveshaft TW of the drive engine VM by way of the transfer box VG and with one another by way of the variator V in a symmetrical arrangement, a gearshift from an initially loaded gear of one partial transmission (TG1 or TG2) to a target gear of the other partial transmission (TG2 or TG1) can in each case take place in the same way. Consequently a method according to the invention is provided for controlling shifts in a powershift transmission which comprises two partial transmissions TG1, TG2 each with a respective input shaft GE1, GE2, which on the input side can be brought into driving connection, by means of a main separator clutch (CL1, CL2; CL1', CL2'; CL1*, CL2*), with the driveshaft TW of a drive engine VM and on the output side, by way of a plurality of selectively engaged gear steps (G1 to G7, R) having different gear ratios, with a common output shaft GA, wherein on the input side the two input shafts GE1, GE2 can be connected to and disconnected from an associated intermediate shaft ZW1, ZW2 by means of the respective main separator clutch (CL1, CL2; CL1', C:2'; CL1*, CL2*), and wherein the two intermediate shafts ZW1, ZW2 are directly in driving connection with one another via a variator V having a continuously adjustable transmission ratio $i_V$ and, via a transfer box GV having one input element E0 and two output elements A1, A2, with the driveshaft TW of the drive engine VM, in which method a gearshift carried out as a powershift from an initially loaded gear (for example the third gear G3) of one partial transmission (for example TG2) to a target gear (for example the second gear G2) of the other partial transmission (for example TG1) takes place by the following steps:

q) synchronization of the main separator clutch (CL1, CL1', CL1*) of the other partial transmission (TG1) by adjusting the transmission ratio of the variator V and at the same time adapting the rotational speed of the drive engine VM, r) engaging the main separator clutch (CL1, CL1', CL1*) of the other partial transmission (TG1), s) synchronizing the gear clutch (C, C') of the target gear (G2) by adjusting the transmission ratio of the variator V and at the same time adapting the rotational speed of the engine (VM), t) engaging the gear clutch (C, C') of the target gear (G2), u) load uptake by the other partial transmission (TG1) by a slight ratio adjustment of the variator V, v) disengaging the main separator clutch (CL2, CL2', CL2*) of the one partial transmission (TG2), w) disengaging the gear clutch (G, G') of the loaded gear (G3), x) adapting the rotational speed of the drive engine VM and at the same time resetting the variator V to its rest transmission ratio ($i_{V\_0}=1$).

In this method, regardless of the structure of the main separator clutches (CL1, CL2; CL1', CL2'; CL1*, CL2*) and of the gear clutches (A to H; A' to H'), it is provided that during a shift from an initially loaded gear of one partial transmission (TG1 or TG2) to a target gear of the other partial transmission (TG2 or TG1), here for example during a downshift from the third gear G3 to the second gear G2, both the first main separator clutch (CL1, CL1', CL1*) and also the gear clutch (C, C') of the target gear (G2) are each synchronized by an appropriate adjustment of the transmission ratio of the variator V. Since the intermediate shaft (ZW1) associated with the target gear (G2) is in driving connection via the transfer box VG with the driveshaft TW of the drive engine VM, in each case a rotational speed adaptation of the drive engine VM is carried out, so avoiding an abrupt rotational speed change at the output shaft GA (process steps q and s). In the context of the invention it goes without saying that to avoid a torque collapse at the output shaft GA, the rotational speed adaptation of the drive engine VM is carried out as much as possible in such manner that the engine power, i.e. the product of the engine torque $M_{VM}$ and the engine rotational speed $n_{VM}$, is kept constant during this ($M_{VM} * n_{VM}$ const.).

For the load uptake by the other partial transmission (TG1) the two intermediate shafts ZW1, ZW2 are then braced relative to one another by a slight transmission ratio adjustment of the variator V in the direction toward a higher ratio $i_V$ (process step u), whereby the second main separator clutch (CL2, CL2', CL2*) and the input shaft (GE2) of the one partial transmission (TG2) are relieved from the transmitted engine torque $M_{VM}$ of the drive engine VM whereas the first main separator clutch (CL1, CL1', CL1*) and the input shaft (GE1) of the other partial transmission (TG1) are loaded by the transmitted engine torque $M_{VM}$ of the drive engine VM.

If at least the main separator clutch (for example CL', CL*) of the other partial transmission (for example TG1) is in the form of a frictionally synchronized synchronous clutch or a disk clutch, then process step q) can also be replaced by the following step:

q*) synchronization of the main separator clutch (CL1', CL1*) of the other partial transmission (TG1) by means of the friction elements of the main separator clutch (CL1', CL1*) of the other partial transmission (TG1).

In that case, the input shaft (GE1) of the other partial transmission (TG1), which before the shifting process has no mechanical connection to the associated intermediate shaft (ZW1) and to the output shaft GA and which is rotating relatively slowly under the action of active drag torques, is accelerated due to compression of the friction elements of the associated main separator clutch (CL', CL1*) until it reaches the synchronous rotational speed. For this, no ratio adjustment of the variator V is needed. Thereafter, the main separator clutch (CL1', CL1*) concerned is engaged if in the form of a synchronous clutch (CL1') or closed by compression if in the form of a disk clutch (CL1*) (process step r).

If the gear clutches (A' to H') for engaging the gear steps (G1 to G7, R) are made as frictionally synchronized synchronous clutches, the process steps q) to t) can also be replaced by the following steps:

q') synchronization of the gear clutch (C') of the target gear (G2) by means of its friction elements, r') engagement of the gear clutch (C') of the target gear (G2), s') synchronization of the main separator clutch (CL1, CL1', CL1*) of the other partial transmission (TG1) by adjusting the transmission ratio of the variator V and at the same time adapting the rotational speed of the drive engine VM, t') engagement of the main separator clutch (CL1, CL1', CL1*) of the other partial transmission (TG1).

In that case the input shaft (GE1) of the other partial transmission (TG1) is first accelerated by compressing the friction elements of the gear clutch (C') of the target gear (G2) until it reaches the synchronous speed and the gear clutch (C') is engaged (process steps q' and r'). For this, no ratio adjustment of the variator V is needed. Thereafter, the associated main separator clutch (CL1, CL1', CL1*) is synchronized by an appropriate adjustment of the transmission ratio of the variator V in combination with a corresponding rotational speed adaptation of the engine VM, and is then engaged (process steps s' and t'). Compared with the two previously described method variants, therefore, the sequence in which the main separator clutch (CL1, CL1', CL1*) of the other partial transmission (TG1) and the gear clutch (C') of the target gear (G2) are synchronized, is reversed.

When no shifting processes are taking place, in order to avoid a permanent force flow by way of the variator V and the associated loss of efficiency, in all the method variants described above it is preferably provided that in the absence of shifting processes the variator V is decoupled by disengaging a separator clutch arranged between the variator V and the first intermediate shaft ZW1, and bridged by engaging a bridging clutch J arranged directly or indirectly between the two intermediate shafts ZW1, ZW2.

BRIEF DESCRIPTION OF THE DRAWINGS

To clarify the invention further, the description of a drawing with a number of example embodiments is given below.

The drawing shows.

DETAILED DESCRIPTION OF THE PREFERRED EMBODIMENTS

Figure 1A:
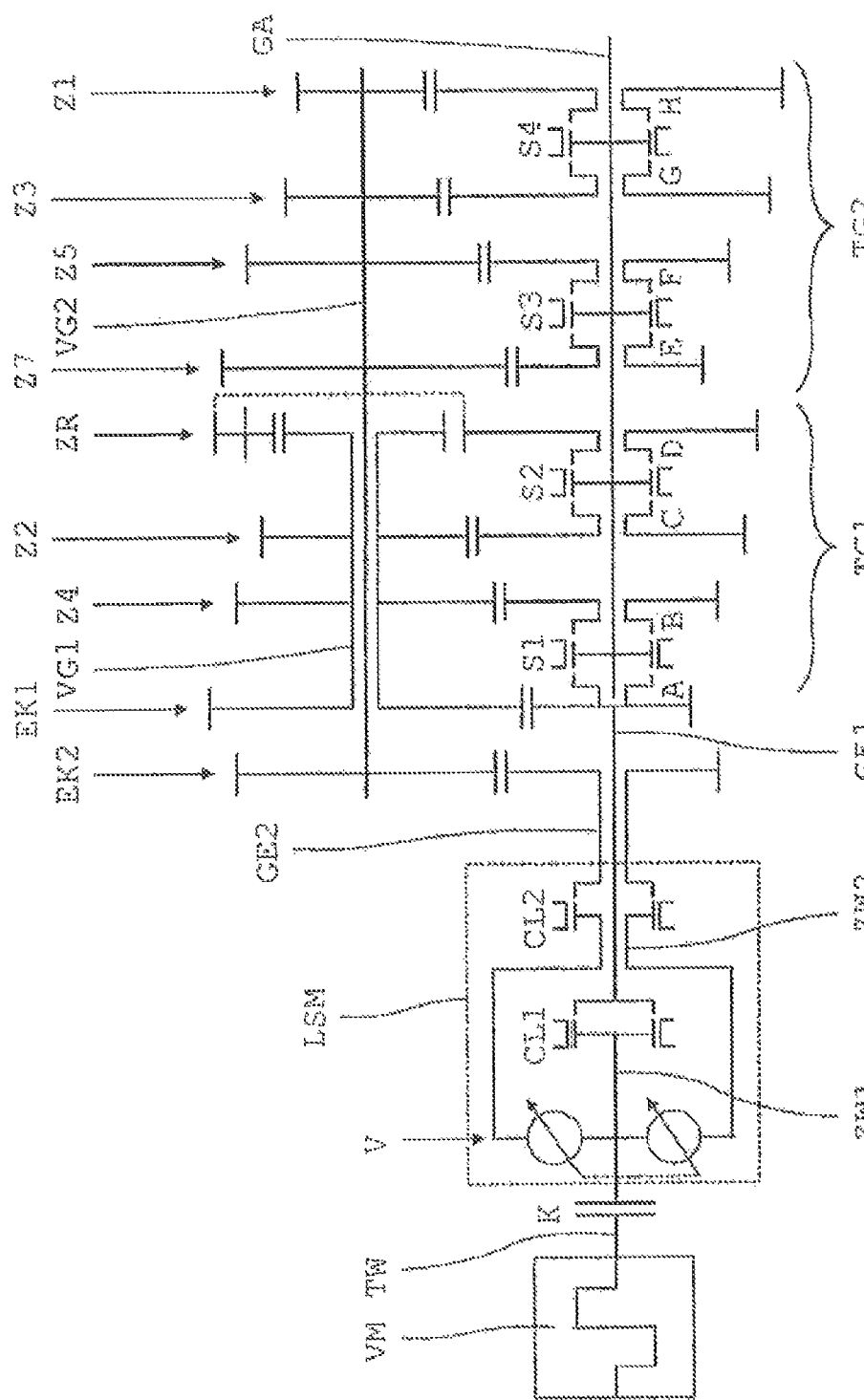
FIG. 1a: Schematic view of a first embodiment of the powershift transmission according to the invention.

Thus, FIG. 1a shows a schematic view of a first embodiment variant of a powershift transmission designed according to the invention. The powershift transmission consists of a basic transmission comprising two partial transmissions TG1, TG2 each with a respective input shaft GE1, GE2, each of which can be brought into driving connection with a common output shaft GA by way of a plurality of selectively engaged gear steps G1 to G7, R having different gear ratios, as well as components arranged between the two input shafts GE1, GE2 and the driveshaft TW of a drive engine VM. In this case the drive engine VM is an internal combustion engine and the driveshaft TW has a starting clutch K. According to the definition used here, the driveshaft TW thus also includes the output side of the starting clutch K.

The basic transmission is derived from a dual clutch transmission and in this case, for example, is designed such that the two input shafts GE1, GE2 are arranged coaxially one over another and the output shaft GA is arranged coaxially with and axially close to the input shafts GE1, GE2.

The first input shaft GE1 is arranged centrally and is in driving connection with a first countershaft VG1 by way of a first input constant EK1. The first countershaft VG1 is in the form of a hollow shaft arranged coaxially over a second countershaft VG2. Between the first countershaft VG1 and the output shaft GA are arranged three spur gear stages Z2, Z4, ZR with different gear ratios. The two spur gear stages Z2 and Z4, by way of which the force flow takes place in the second gear G2 and in the fourth gear G4, each consist of a fixed wheel connected in a rotationally fixed manner to the first, hollow countershaft VG1 and a loose wheel mounted to rotate on the output shaft GA but that can be connected in a rotationally fixed manner thereto by a respective, associated gear clutch B, C. The spur gear stage ZR is designed as a reversing spur gear stage by way of which the force flow takes place in the reversing gear R. This reversing spur gear stage ZR comprises a fixed wheel connected in a rotationally fixed manner to the first countershaft VG1, a loose wheel mounted to rotate on the output shaft GA but that can be connected to it in a rotationally fixed manner by means of an associated gear clutch D, and arranged between these two gearwheels, an intermediate wheel indicated by a dotted line.

By means of a gear clutch A the first input shaft GE1 can be connected directly and in a rotationally fixed manner to the output shaft GA, whereby a sixth gear G6 acting as a direct-drive gear can be engaged. The first input shaft GE1, the first countershaft VG1 and a first section of the output shaft GA and the spur gear stages EK1 Z2, Z4, ZR and gear clutches A, B, C, D arranged between those transmission shafts, form the first partial transmission TG1, with which therefore the even-numbered forward gears G2, G4, G6 and the reversing gear R are associated.

The second input shaft GE2 is in the form of a hollow shaft arranged over the first input shaft GE1. The second input shaft GE2 is in driving connection with the second countershaft VG2 by way of a second input constant EK2. Between the second countershaft VG2 and the output shaft GA are arranged four spur gear stages Z1, Z3, Z5, Z7 with different gear ratios. These spur gear stages Z1, Z3, Z5, Z7, by way of which the force flow takes place in the first G1, the third G3, the fifth G5 and the seventh G7 gears respectively, in each case consist of a fixed wheel connected in a rotationally fixed manner to the second countershaft VG2 and a loose wheel mounted to rotate on the output shaft GA but which can be connected in a rotationally fixed manner thereto by means of a respectively associated gear clutch E, F, G, H. The second input shaft GE2, the second countershaft VG2 and a second section of the output shaft GA, as well as the spur gear stages EK2, Z1, Z3, Z5, Z7 and gear clutches E, F, G, H arranged between these transmission shafts, form the second partial transmission TG2, with which therefore the odd-numbered forward gears G1, G3, G5, G7 are associated.

In the present case the gear clutches A, B, C, D, E, F, G, H are for example in the form of unsynchronized claw clutches and are combined in pairs in double shifting elements S1, S2, S3, S4.

On the input side the two input shafts GE1, GE2 can in each case be connected to and disconnected from two associated intermediate shafts ZW1, ZW2 by means of a respective main separator clutch CL1, CL2. In this case the main separator clutches CL1, CL2 are for example in the form of unsynchronized claws clutches. The first intermediate shaft ZW1 is connected directly to the driveshaft TW of the drive engine VM in a rotationally fixed manner by means of the starting clutch K. The second intermediate shaft ZW2 is in driving connection with the first intermediate shaft ZW1 by way of a variator V with continuously adjustable transmission ratio $i_V$ and a rest transmission ratio equal to one $i_{V\_0}$=1). The two main separator clutches CL1, CL2, the two intermediate shafts ZW1, ZW2 and the variator V are combined in a pre-assembled powershift module LSM.

Thus, in a load-carrying gear (G2, G4, G6 or R) of the first partial transmission TG1 the force flow takes place from the driveshaft TW of the drive engine VM, via the first intermediate shaft ZW1 and the first input shaft GE1 (the main separator clutch CL1 being engaged), directly or via the first countershaft VG1 and one of the associated spur gear stages (Z2, Z4 or ZR), to the output shaft GA (gear clutch A, B, C or D engaged). In a load-carrying gear (G1, G3, G5 or G7) of the second partial transmission TG2 the force flow, in contrast, takes place from the driveshaft TW of the drive engine VM, via the first intermediate shaft ZW1, the variator V, the second intermediate shaft ZW2, the second input shaft GE2 (main separator clutch CL2 engaged), the second countershaft VG2 and one of the associated spur gear stages (Z1, Z3, Z5 or Z7), to the output shaft GA (gear clutch E, F, G or H engaged), this path being characterized by a lower transmission efficiency due to the force transmission by way of the variator V.

However, by a transmission ratio adjustment of the variator V the rotational speeds $n_{ZW1}$, $n_{ZW2}$ of the two intermediate shafts ZW1, ZW2 can advantageously be changed relative to one another, which in a gearshift between an initially loaded gear and a target gear in different partial transmissions TG1, TG2, can be used for synchronizing the main separator clutch (CL1 or CL2) of the partial transmission (TG1 or TG2) that comprises the target gear and the gear clutch (A, B, C or D, or else E, F, G or H) of the target gear (G2, G4, G6 or R, or else G1, G3, G5, or G7). Thus, the powershift module LSM can replace the friction clutches usually present in a dual clutch transmission, whereby during powershifts the friction slipping that usually takes place therein is eliminated so that a higher efficiency is achieved. Such process sequences for the control of gearshifts carried out as powershifts will be described in detail later.

FIG. 1b shows schematically a first further development of the first embodiment variant of the powershift transmission shown in FIG. 1a, which consists in that the gear clutches A' to H' of the two partial transmissions TG1, TG2 are now in the form of frictionally synchronized, synchronous clutches combined in pairs in dual shifting elements S1', S2', S3', S4'. This makes it possible, during a gearshift between a loaded gear and a target gear in different partial transmissions TG1, TG2, to reverse the sequence in which the main separator clutch (CL1 or CL2) of the partial transmission (TG1 or TG2) that comprises the target gear and the gear clutch (A', B', C' or D', or else E', F', G' or H') of the target gear (G2, G4, G5 or R, or else G1, G3, G5, G7) are synchronized, i.e. first by pressing together the relevant friction elements to synchronize the gear clutch (A', B', C' or D', or else E', F', G' or H') of the target gear (G2, G4, G6 or R, or else G1, G3, G5, or G7), and thereafter, by adjusting the transmission ratio of the variator V, to synchronize the main separator clutch (CL1 or CL2) of the partial transmission (TG1 or TG2) that comprises the target gear. Such process sequences for the control of gearshifts carried out as powershifts will be described in detail later.

Figure 1C:
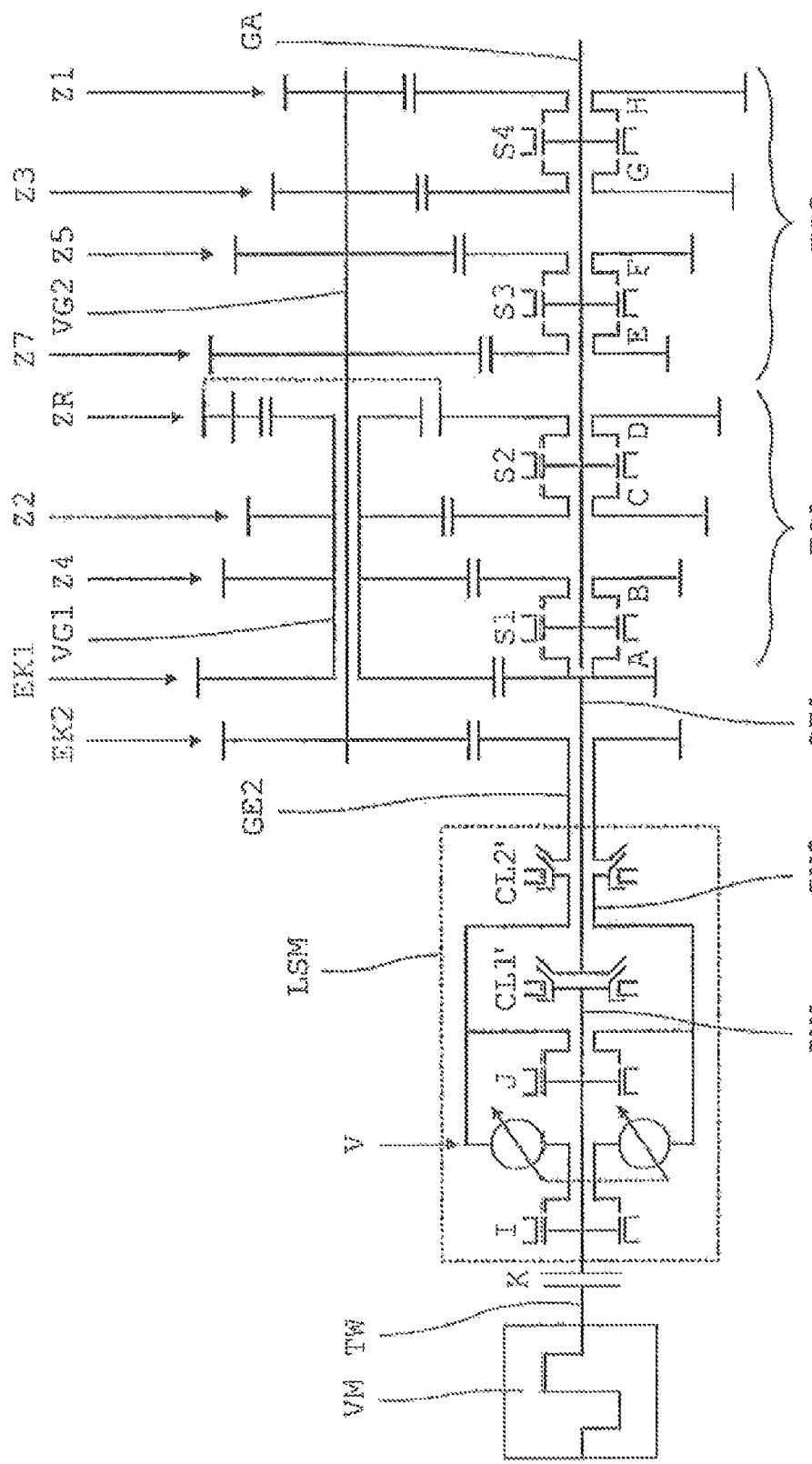
FIG. 1b: Schematic view of a first further development of the powershift transmission shown in FIG. 1a, FIG. 1c: Schematic view of a second further development of the powershift transmission shown in FIG. 1a, FIG. 1d: Schematic view of a further development of the powershift transmission shown in FIG. 1c, FIG. 2a: Schematic view of a second embodiment of the powershift transmission according to the invention.

FIG. 1c shows schematically a second further development of the first embodiment of the powershift transmission shown in FIG. 1a, which consists in that the two main separator clutches CL1', CL2' are now in the form of frictionally synchronized synchronous clutches. This makes it possible, during a gearshift between an initially loaded gear and a target gear in different partial transmissions TG1, TG2, to carry out the synchronization of the main separator clutch (CL1' or CL2') of the partial transmission (TG1 or TG2) comprising the target gear, which is done at the beginning, by compressing the friction elements of the main separator clutch (CL1' or CL2') concerned instead of adjusting the transmission ratio of the variator V.

A further deviation compared with the first embodiment of the powershift transmission shown in FIG. 1a consists in that the variator V can now be connected to and disconnected from the first intermediate shaft ZW1 by means of a separator clutch I, and the two intermediate shafts ZW1, ZW2 can be connected to by a bridging clutch J, directly and in a rotationally fixed manner, and disconnected from one another thereby. By disengaging the separator clutch I and engaging the bridging clutch J, in a load-carrying gear (G1, G3, G5 or G7) of the second partial transmission TG2, outside shifting processes a permanent force flow via the variator and the associated loss of efficiency can be avoided.

FIG. 1d shows schematically a further development of the embodiment of the powershift transmission shown in FIG. 1c, which consists in that the two main separator clutches CL1*, CL2* are now in the form of disk clutches. As in the previously described variant this makes it possible, during a gearshift between an initially loaded gear and a target gear in different partial transmissions TG1, TG2, to carry out the synchronization of the main separator clutch (CL1*, CL2*) of the partial transmission (TG1 or TG2) that comprises the target gear, which is done at the beginning, by pressing together the friction elements of the main separator clutch (CL1*, CL2*) concerned instead of adjusting the transmission ratio of the variator V. Such process sequences for the control of gearshifts carried out as powershifts will be described in detail later on.

A further change compared with the previously described variant of the powershift transmission shown in FIG. 1c, consists in that the separator clutch I and the bridging clutch J are now combined in a dual shifting element S5, whereby compared with when the clutches I, J are arranged separately, one clutch control element can be saved.

Figure 2A:
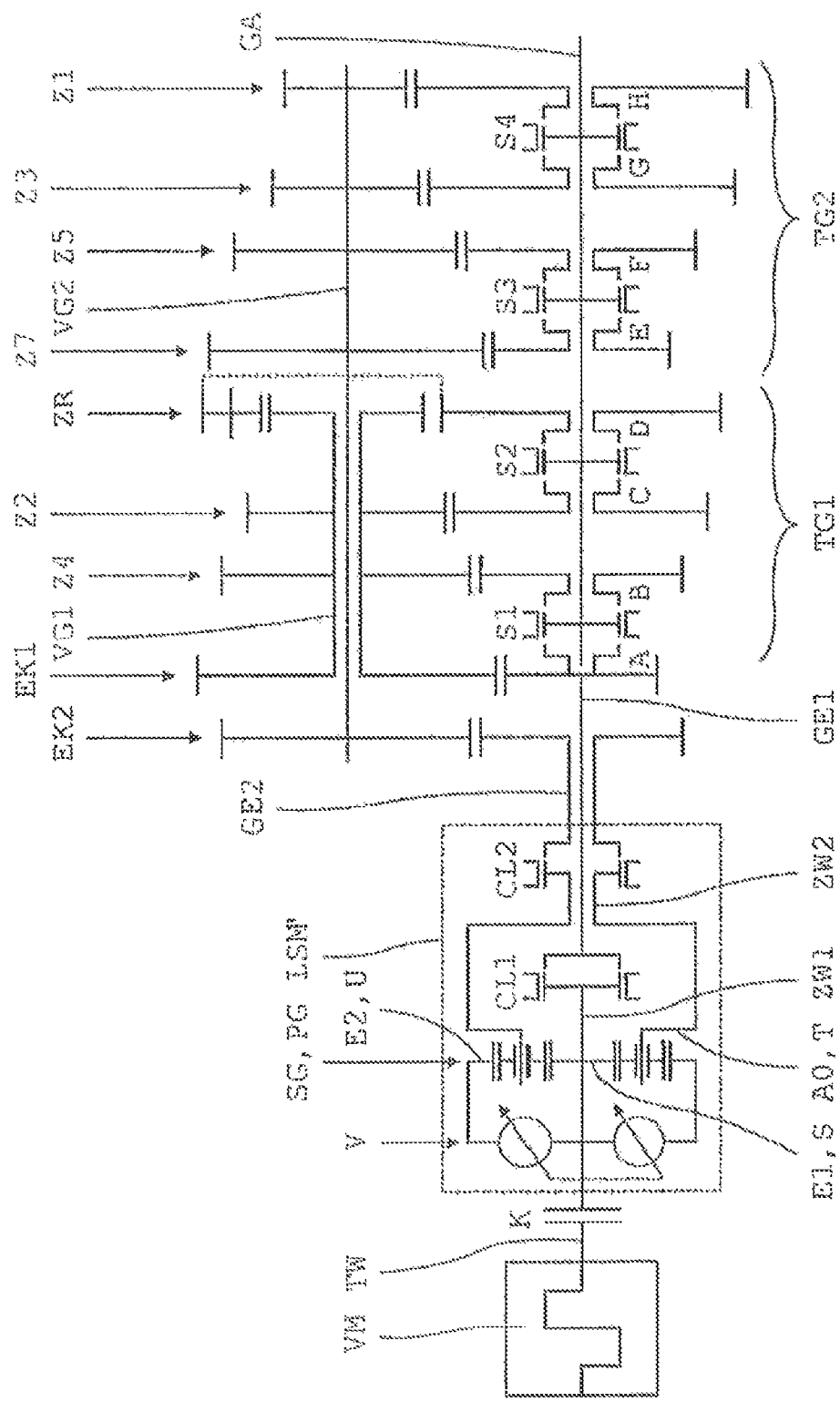
FIG. 2b: Schematic view of a first further development of the powershift transmission shown in FIG. 2a, FIG. 2c: Schematic view of a second further development of the powershift transmission shown in FIG. 2a, FIG. 2d: Schematic view of a third further development of the powershift transmission shown in FIG. 2a, FIG. 2e: Schematic view of a further development of the powershift transmission shown in FIG. 2d, FIG. 3a: Schematic view of a third embodiment of the powershift transmission according to the invention.

FIG. 2a shows schematically a second embodiment of the powershift transmission. This powershift transmission comprises the same basic transmission as the first embodiment in FIG. 1a. Likewise, on the input side the two input shafts GE1, GE2 can be connected to and disconnected from an associated intermediate shaft ZW1, ZW2 by means of the respective main separator clutch CL1, CL2. In addition, the first intermediate shaft ZW1 is again connected directly and in a rotationally fixed manner to the driveshaft TW of the drive engine VM. By contrast with the first embodiment in FIG. 1a, however, this time the second intermediate shaft ZW2 is in driving connection with the first intermediate shaft DTI via a variator V with a continuously adjustable transmission ratio $i_V$ and a rest ratio equal to one ($i_{V\_0}=1$) and also via a superposition gearset SG with two input elements E1, E2 and one output element A0. The first input element E1 is connected directly and rotationally fixed to the first intermediate shaft ZW1, the second input element E2 is in driving connection with the first intermediate shaft ZW1 via a variator V, and the output element A0 is connected to the second intermediate shaft ZW2 in a rotationally fixed manner.

In this case the superposition gearset SG is in the form of a simple planetary gearset PG with a sun gear S, a planetary carrier T carrying a plurality of planetary gearwheels, and a ring gear U, in which the sun gear S is the first input element E1, the ring gear U is the second input element E2 and the planetary carrier T is the output element A0.

In a load-carrying gear (G2, G4, G6 or R) of the first partial transmission TG1, the force flow again takes place from the driveshaft TW of the drive engine VM, via the first intermediate shaft ZW1 and the first input shaft GE1 (with the main separator clutch CL1 engaged), directly or via the first countershaft VG1 and one of the associated spur gear stages (Z2, Z4 or ZR), to the output shaft GA (gear clutch A, B, C or D engaged). In a load-carrying gear (G1, G3, G5 or G7) of the second partial transmission TG2, however, the force flow now takes place from the driveshaft TW of the engine VM, via the first intermediate shaft ZW1 and then via two parallel transmission branches, namely on the one hand directly to the first input element E1 (the sun gear S) of the superposition gearset SG (planetary transmission PG), and on the other hand via the variator V to the second input element (ring gear U) of the superposition gearset SG (planetary gearset PG), where the two transmission branches merge and the corresponding rotational speeds and torques are superposed. The force flow then continues from the output element A0 (planetary carrier T) of the superposition gearset SG (planetary gearset PG), via the second intermediate shaft ZW2, the second input shaft GE2 (with main separator clutch CL2 engaged), the second countershaft VG2 and one of the associated spur gear stages (Z1, Z3, Z5 or Z7), to the output shaft GA (with E, F, G or H engaged).

By virtue of the drive-technical connection of the variator V, therefore, in this case only part of the engine torque $M_{VM}$ is transmitted via the variator V, so that the transmission efficiency is less impaired than in the first embodiment of the powershift transmission shown in FIG. 1a. However it can be a disadvantage of this arrangement that to produce a given rotational speed difference ($\Delta n_{ZW}=n_{ZW2}-n_{ZW1}$) between the two intermediate shafts ZW1, ZW2, a larger transmission ratio adjustment of the variator V is needed, since this is reduced by the superposition gearset SG and indeed halved if the configuration of the superposition gearset SG is symmetrical, as preferred. In addition to the two main separator clutches CL1, CL2, the two intermediate shafts ZW1, ZW2 and the variator V, the pre-assembled powershift module LSM' now also contains the superposition gearset SG.

In principle, however, as with the first embodiment of the powershift transmission shown in FIG. 1a, in this case too (FIG. 2a) the rotational speeds $n_{ZW1}$, $n_{ZW2}$ of the two intermediate shafts ZW1, ZW2 can be changed relative to one another by adjusting the transmission ratio of the variator V, which can be using during a gearshift between an initially loaded gear and a target gear in different partial transmissions TG1, TG2 for synchronizing the main separator clutch (CL1 or CL2) of the partial transmission (TG1 or TG2) comprising the target gear and the gear clutch (A, B, C or D, or else E, F, G or H) of the target gear (G2, G4, G6 or R, or else G1, G3, G5 or G7). Such process sequences for the control of gearshifts carried out as powershifts will be described in detail farther on.

Figure 2B:
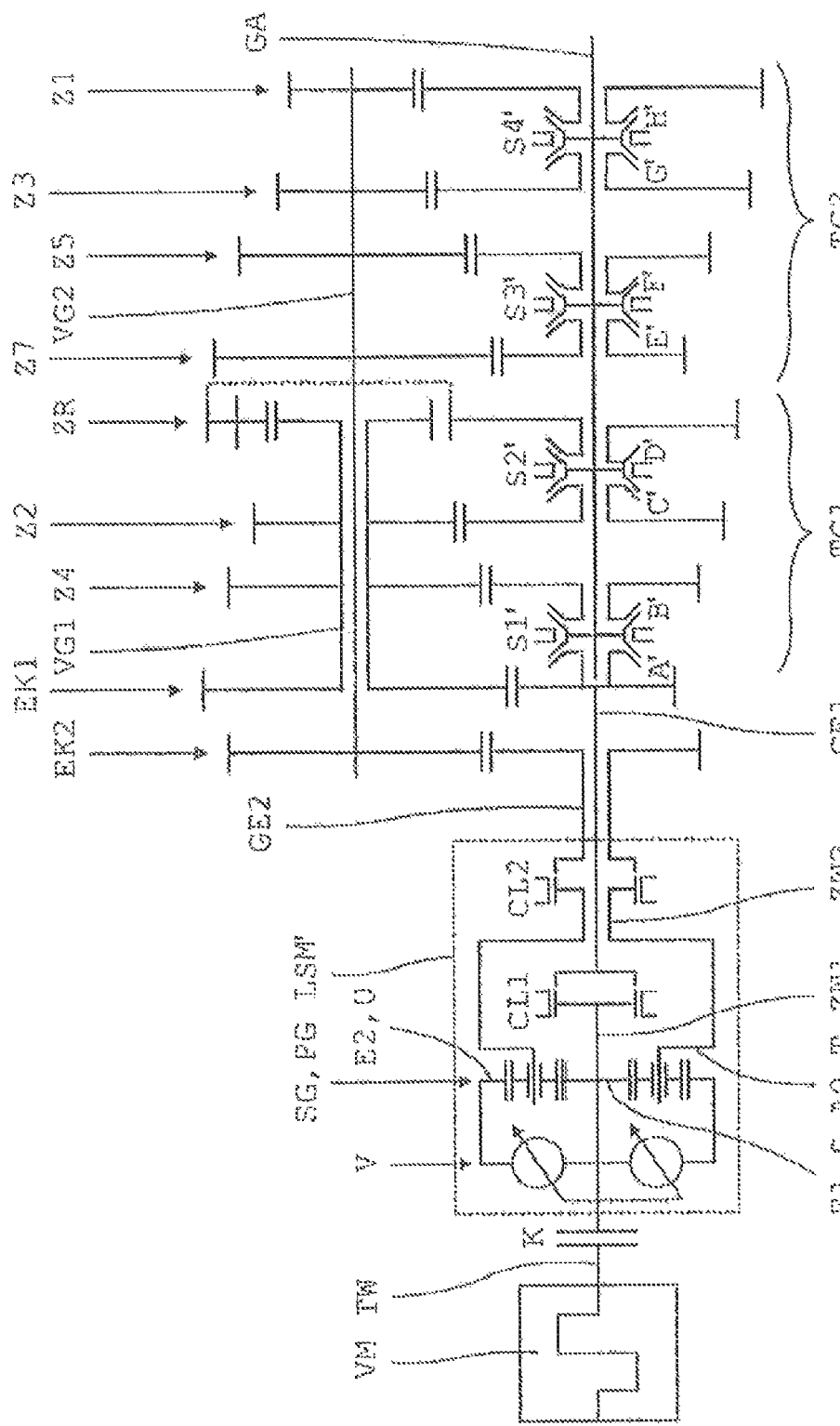

FIG. 2b shows schematically a first further development of the second embodiment of the powershift transmission in FIG. 2a. This further development consists in that the gear clutches A' to H' of both partial transmissions TG1, TG2 are this time in the form of frictionally synchronized synchronous clutches combined in pairs in dual shifting elements S1', S2', S3', S4'. This makes it possible, during a gearshift between an initially loaded gear and a target gear in different partial transmissions TG1, TG2, to reverse the synchronization sequence of the main separator clutch (CL1 or CL2) of the partial transmission (TG1 or TG2) that comprises the target gear and the gear clutch (A', B', C' or D', or else E', F', G' or H') of the target gear (G2, G4, G6 or R, or else G1, G3, G5 or G7), i.e. first, by pressing together the relevant friction elements of the gear clutch (A', B', C' or D', or else E', F', G' or H') of the target gear (G2, G4, G6 or R, or else G1, G3, G5 or G7), to synchronize that clutch, and thereafter, by adjusting the transmission ratio of the variator V, to synchronize the main separator clutch (CL1 or CL2) of the partial transmission (TG1 or TG2) that contains the target gear. Such process sequences for controlling gearshifts carried out as powershifts will be described in detail later.

Figure 2C:
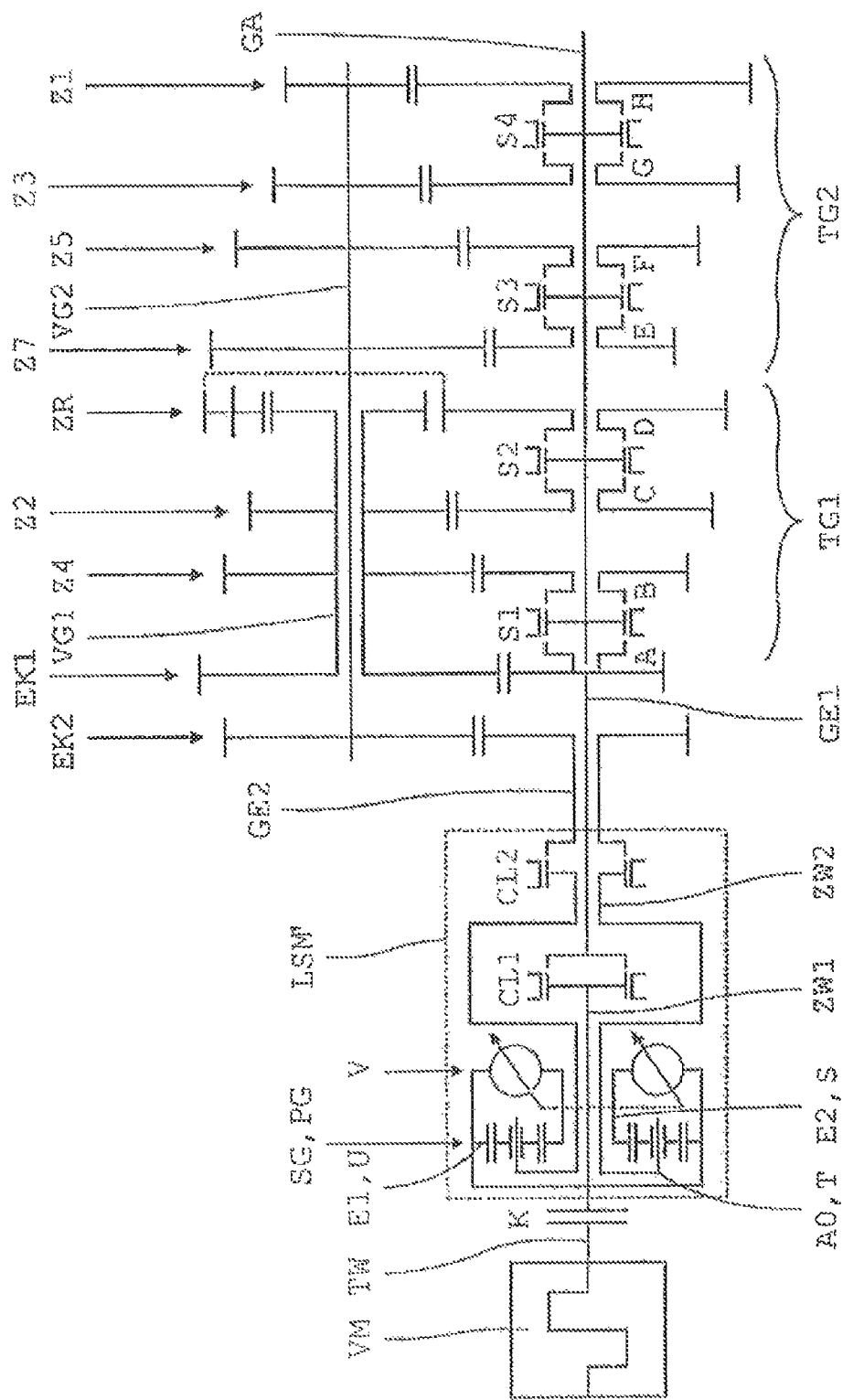

FIG. 2c shows schematically a second further development of the second embodiment of the powershift transmission in FIG. 2a, which consists in a modified drive-technical connection mode of superposition gearset SG. In this case too the superposition gearset SG is in the form of a simple planetary gearset PG with a sun gear S, a planetary carrier T carrying a plurality of planetary gearwheels, and a ring gear U. However, now the ring gear U forms the first input element E1 of the superposition gearset SG, which is connected directly and rotationally fixed to the first intermediate shaft ZW1, and the sun gear S forms the second input element E2 of the superposition gearset SG, which is in driving connection with the first intermediate shaft ZW1 via the variator V. On the other hand, as before the planetary carrier T forms the output element A0 of the superposition gearset SG, which is connected directly and in a rotationally fixed manner to the second intermediate shaft ZW2. The operational mode of this variant, however, corresponds exactly to that of the second embodiment of the powershift transmission shown in FIG. 2a.

Figure 2D:
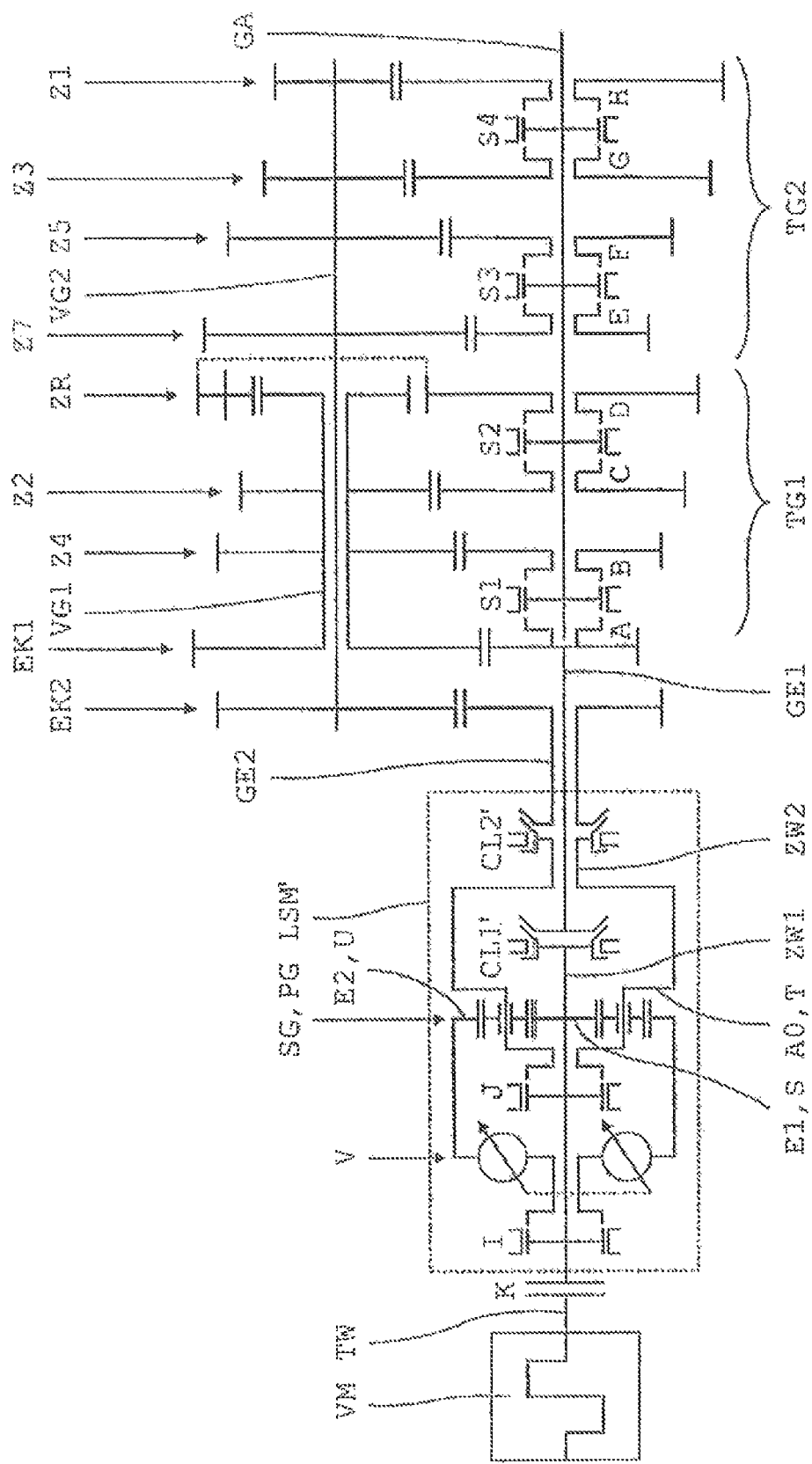

FIG. 2d shows schematically a third further development of the second embodiment of the powershift transmission in FIG. 2a, which consists in that the two main separator clutches CL1', CL2' are now both in the form of frictionally synchronized synchronous clutches. This makes it possible, during a gearshift between an initially loaded gear and a target gear in different partial transmissions TG1, TG2, to carry out the synchronization of the main separator clutch (CL1' or CL2') of the partial transmission (TG1 or TG2) that comprises the target gear, which synchronization is done at the beginning, by pressing together the friction elements of the main separator clutch (CL1' or CL2') concerned instead of by adjusting the transmission ratio of the variator V.

A further change compared with the second embodiment of the powershift transmission in FIG. 2a consists in that the variator V can now be connected to and disconnected from the first intermediate shaft ZW1 by means of a separator clutch I, and the two intermediate shafts ZW1, ZW2 can indirectly be connected to and disconnected from one another in a rotationally fixed manner by means of a bridging clutch J, i.e. by a rotationally fixed connection of the first intermediate shaft ZW1 to the output element A0 (planetary carrier T) of the superposition gearset SG (planetary gearset PG). By disengaging the separator clutch I and engaging the bridging clutch J, in a load-carrying gear (G1, G3, G5 or G7) of the second partial transmission TG2, outside of shifting processes a permanent force flow via the variator V and the associated loss of efficiency can be avoided.

FIG. 2e shows schematically a further development of the embodiment variant of the powershift transmission in FIG. 2d, which consists in that the two main separator clutches CL1*, CL2* are now in the form of disk clutches. As with the variant described previously, this makes it possible during a gearshift between an initially loaded gear and a target gear in different partial transmissions TG1, TG2, to carry out the synchronization of the main separator clutch (CL1*, CL2*) of the partial transmission (TG1 or TG2) containing the target gear, which is done at the beginning, by compressing the friction elements of the main separator clutch (CL1*, CL2*) concerned, instead of by adjusting the transmission ratio of the variator. Such process sequences for the control of gearshifts carried out as powershifts will be described in detail later.

A further change compared with the previously described variant of the powershift transmission shown in FIG. 2d consists in that the separator clutch I and the bridging clutch J are now combined in a dual shifting element S5, whereby compared with the separate arrangement of the two clutches I, J, one clutch control element is saved.

Figure 3A:
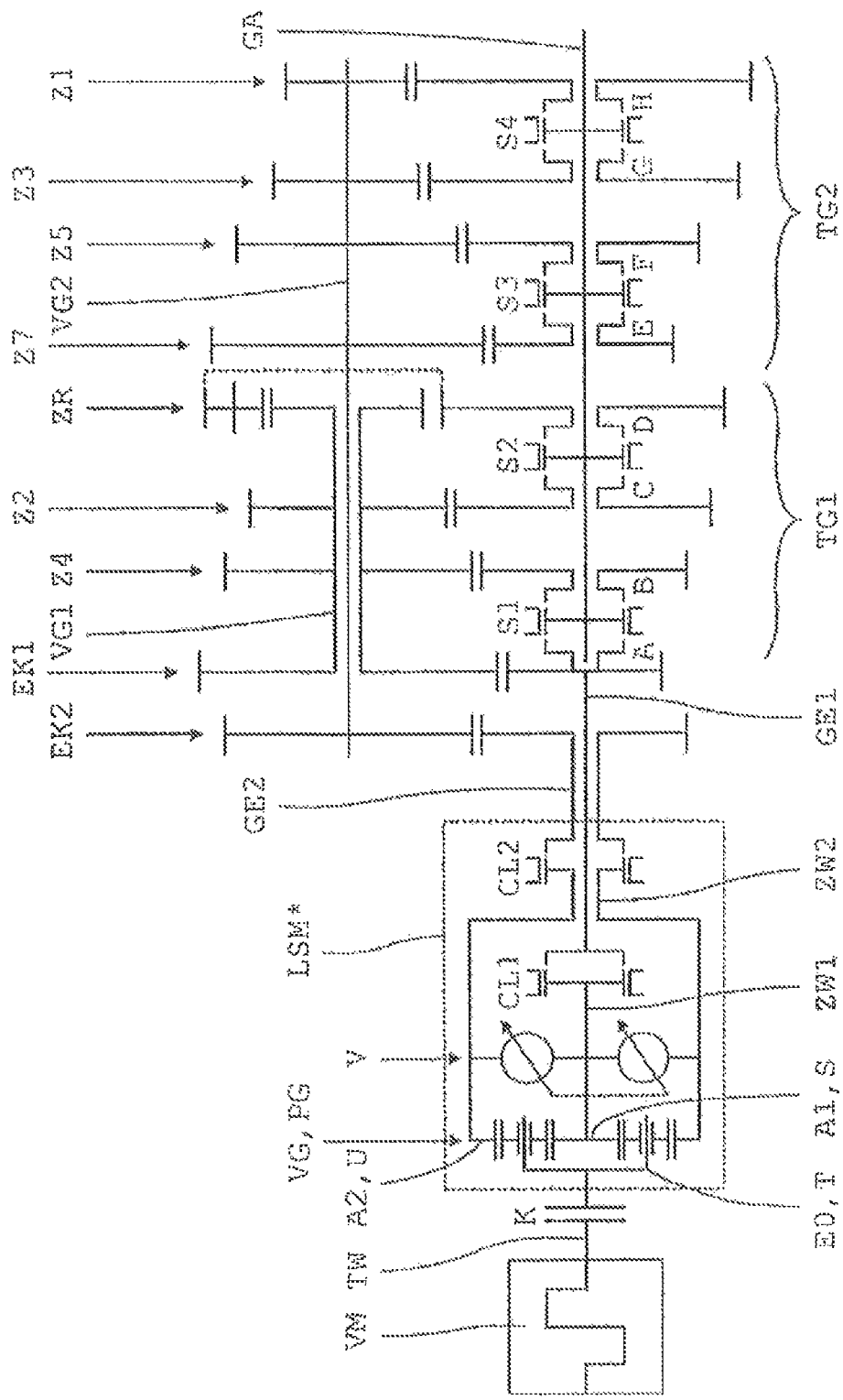
FIG. 3b: Schematic view of a first further development of the powershift transmission shown in FIG. 3a, FIG. 3c: Schematic view of a second further development of the powershift transmission shown in FIG. 3a, FIG. 3d: Schematic view of a third further development of the powershift transmission shown in FIG. 3a, FIG. 3e: Schematic view of a further development of the powershift transmission shown in FIG. 3d, FIGS. 4a-4e: A shifting process of the powershift transmission shown in FIGS. 1a and 2a, controlled in accordance with the invention, represented in a time diagram.

FIG. 3a shows schematically a third embodiment of the powershift transmission according to the invention. This powershift transmission comprises the same basic transmission as the first embodiment in FIG. 1a. Likewise, on the input side the two input shafts GE1, GE2 can be connected to and disconnected from a respective associated intermediate shaft ZW1, ZW2 by means of a respective main separator clutch CL1, CL2. As in the powershift transmission according to FIG. 1a, the two intermediate shafts ZW1, ZW2 are directly in driving connection with one another via a variator V with continuously adjustable transmission ratio $i_V$ and a rest transmission ratio of one ($i_{V\_0}=1$). In contrast to the embodiment of the powershift transmission shown in FIG. 1a, however, the two intermediate shafts ZW1, ZW2 are in this case in driving connection with the driveshaft TW of the drive engine VM, via a transfer box VG with one input element E0 and two output elements A1, A2, wherein the input element E0 is connected in a rotationally fixed manner to the driveshaft TW of the engine VM, the first output element A1 is connected in a rotationally fixed manner to the first intermediate shaft ZW1, and the second output element A2 is connected in a rotationally fixed manner to the second intermediate shaft ZW2. In FIG. 3a the transfer box VG is in the form of a simple planetary gearset PG with a sun gear S, a planetary carrier T a plurality of planetary gearwheels, and a ring gear U, in which the planetary carrier T is the input element E0, the sun gear S is the first output element A1, and the ring gear U is the second output element A2.

In a load-carrying gear (G2, G4, G6 or R) of the first partial transmission TG1, the force flow now takes place starting from the driveshaft TW of the drive engine VM, into the input element E0 (planetary carrier T) of the transfer box VG (planetary gearset PG), where the engine torque $M_{VM}$ and the engine rotational speed $n_{VM}$ are distributed to the two output elements A1, A2 (sun gear S and ring gear U of the transfer box VG (planetary gearset PG). The force flow then continues along two parallel transmission branches, namely on the one hand from the first output element A1 (sun gear S) of the transfer box VG (planetary gearset PG) directly to the first intermediate shaft ZW1 and on the other hand (shortly afterward) from the second output element A2 (ring gear U) of the transfer box VG (planetary gearset PG), via the second intermediate shaft ZW2 and the variator V, also to the first intermediate shaft ZW1. From the first intermediate shaft ZW1, in which the two transmission branches merge, the force flow then continues by way of the first input shaft GE1 (main separator clutch CU engaged) directly or via the first countershaft VG1 and one of the associated spur gears stages (Z2, Z4 or R) to the output shaft GA (gear clutch A, B, C or D engaged).

In a load-carrying gear (G1, G3, G5 or G7) of the second partial transmission TG2, the force flow takes place from the driveshaft TW of the engine VM to the output shaft GA (main separator clutch CL2 and gear clutch E, F, G or H engaged), with a correspondingly interchanged allocation of the output elements A1, A2 (sun gear S, ring gear U) of the transfer box VG (planetary gearset PG) and the intermediate shafts ZW1, ZW2, by analogy identically by way of the second input shaft GE2 (main separator clutch CL2 engaged), the second countershaft VG2 and one of the spur gear stages (Z1, Z3, Z5 or Z7) of the second partial transmission (gear clutch E, F, G or H engaged).

By virtue of the drive-technical connection of the variator V, in this case only part of the engine torque $M_{VM}$ is transmitted via the variator V, so that the transmission efficiency is less impaired than in the first embodiment of the powershift transmission according to FIG. 1a. Compared with the second embodiment of the powershift transmission shown in FIG. 2a, the direct driving connection of the two intermediate shafts ZW1, ZW2 via the variator V is advantageous, since to produce a given rotational speed difference ($\Delta n_{ZW} = n_{ZW2} - n_{ZW1}$) between the intermediate shafts ZW1, ZW2 there is now (as in the first embodiment of the powershift transmission according to FIG. 1a) no need for a larger transmission ratio adjustment of the variator V. However, it can be a disadvantage of this arrangement that every change of the transmission ratio $i_V$ of the variator V requires a change of the engine rotational speed $n_{VM}$, i.e. a rotational speed adaptation of the engine VM is necessary. In addition to the two main separator clutches CL1, CL2, the two intermediate shafts ZW1, ZW2 and the variator V, the pre-assembled powershift module LSM* also comprises the transfer box VG.

In principle, however, as with the first and second embodiments of the powershift transmission shown respectively in FIGS. 1a and 2a, here too by means of a transmission ratio adjustment of the variator V the rotational speeds $n_{ZW1}$, $n_{ZW2}$ of the two intermediate shafts ZW1, ZW2 can be changed relative to one another, and during a gearshift between a loaded gear and a target gear in different partial transmissions TG1, TG2 this can be used to synchronize the main separator clutch (CL1 or CL2) of the partial transmission that comprises the target gear (TG1 or TG2) and the gear clutch (A, B, C or D, or else E, F, G or H) of the target gear (G2, G4, G6 or R, or else G1, G3, G5 or G7). Such a process sequence for the control of a gearshift carried out as a powershift will be described in detail later.

Figure 3B:
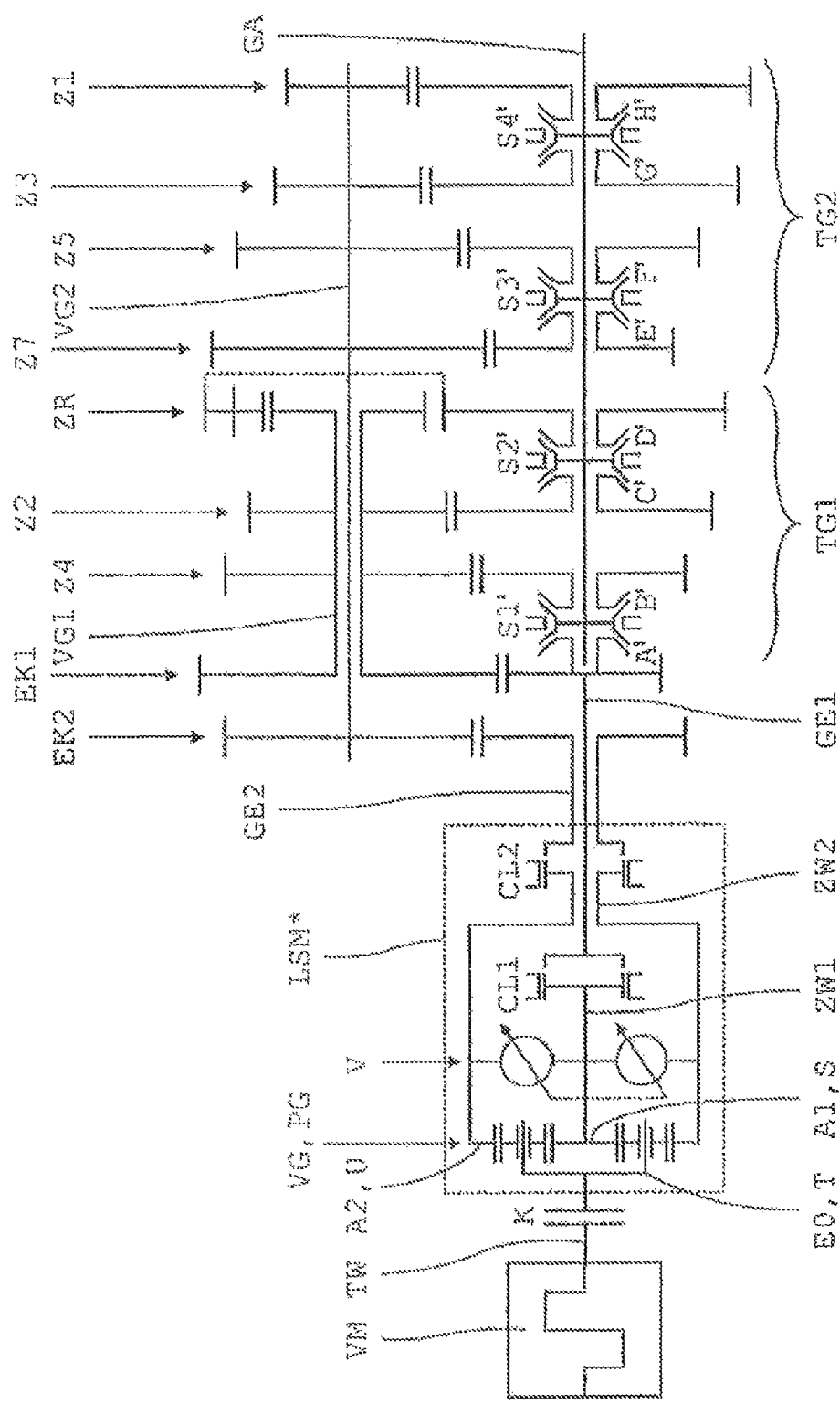

FIG. 3b shows schematically a first further development of the third embodiment of the powershift transmission shown in FIG. 3a, which consists in that the gear clutches A' to H' in both partial transmissions TG1, TG2 are now in the form of frictionally synchronized synchronous clutches, which are combined in pairs in dual shifting elements S1', S2', S3', S4'. This makes it possible, during a gearshift between an initially loaded gear and a target gear in different partial transmissions TG1, TG2, to reverse the synchronization sequence of the main separator clutch (CL1 or CL2) of the partial transmission (TG1 or TG2) comprising the target gear and of the gear clutch (A'AP, B', C' or D', or else E', F', G' or H') of the target gear (G2, G4, G6 or R, or else G1, G3, G5 or G7), i.e. to synchronize first the gear clutch (A', B', C' or D', or else E', F', G' or H') of the target gear (G2, G4, G6 or R, or else G1, G3, G5 or G7) by pressing together the relevant friction elements, and thereafter to synchronize the main separator clutch (CL1 or CL2) of the partial transmission (TG1 or TG2) that comprises the target gear, by adjusting the transmission ratio of the variator V. Such a process sequence for the control of a gearshift carried out as a powershift will be described in detail later.

Figure 3C:
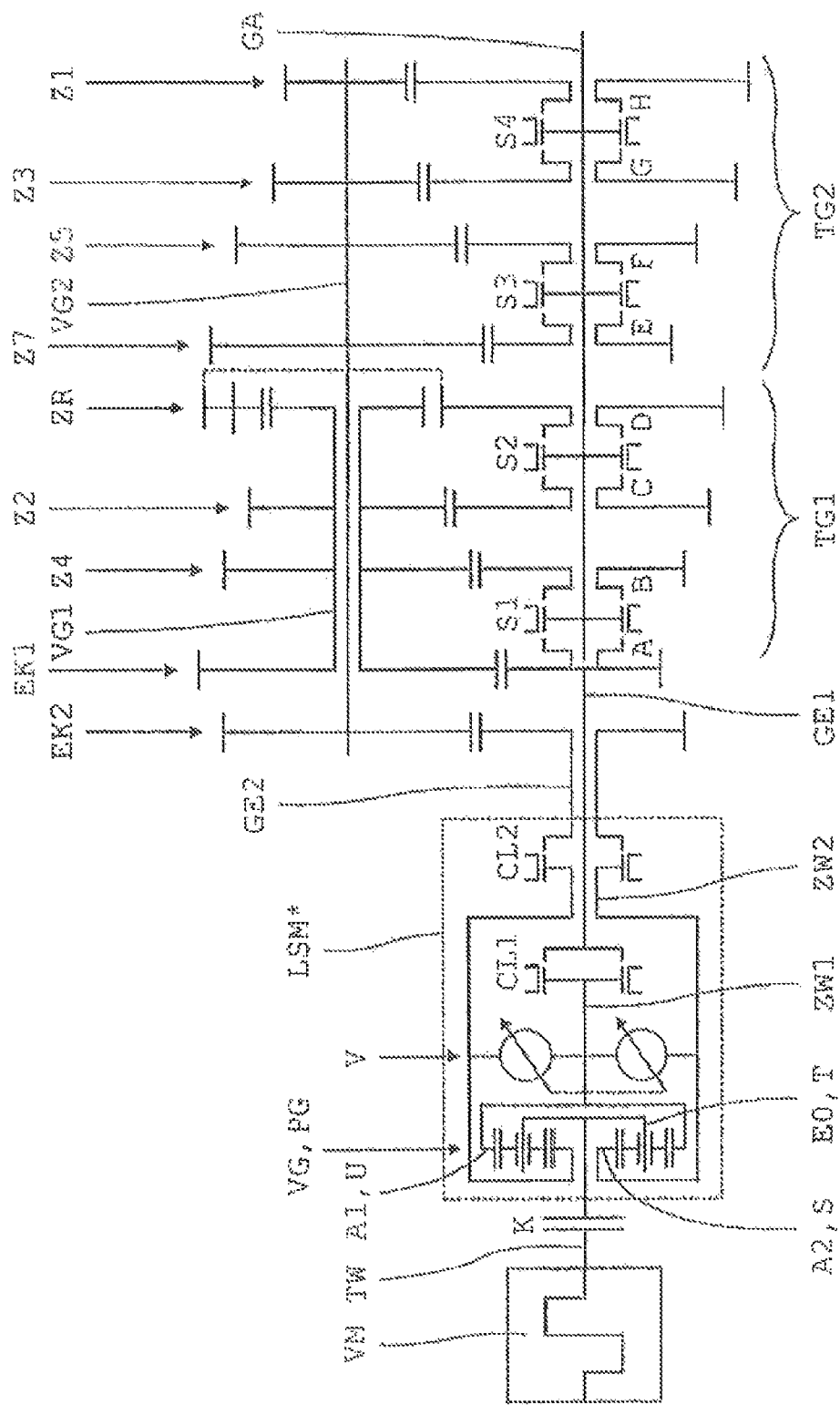

FIG. 3c shows schematically a second further development of the third embodiment of the powershift transmission according to FIG. 3a, which consists in a modified drive-technical connection mode of the transfer box VG. In this case too the transfer box VG is a simple planetary gearset PG with a sun gear S, a planetary carrier T carrying a plurality of planetary gearwheels, and a ring gear U. However, the ring gear U now forms the first output element A1 of the transfer box VG and is connected in a rotationally fixed manner to the first intermediate shaft ZW1 and the sun gear S forms the second output element A2 of the transfer box VG and is connected in a rotationally fixed manner to the second intermediate shaft ZW2. On the other hand, the planetary carrier T, as before, forms the input element E0 of the transfer box VG and is connected directly and in a rotationally fixed manner to the driveshaft TW of the drive engine VM. The mode of action of this variant, however, corresponds exactly to that of the third embodiment of the powershift transmission shown in FIG. 3a.

Figure 3D:
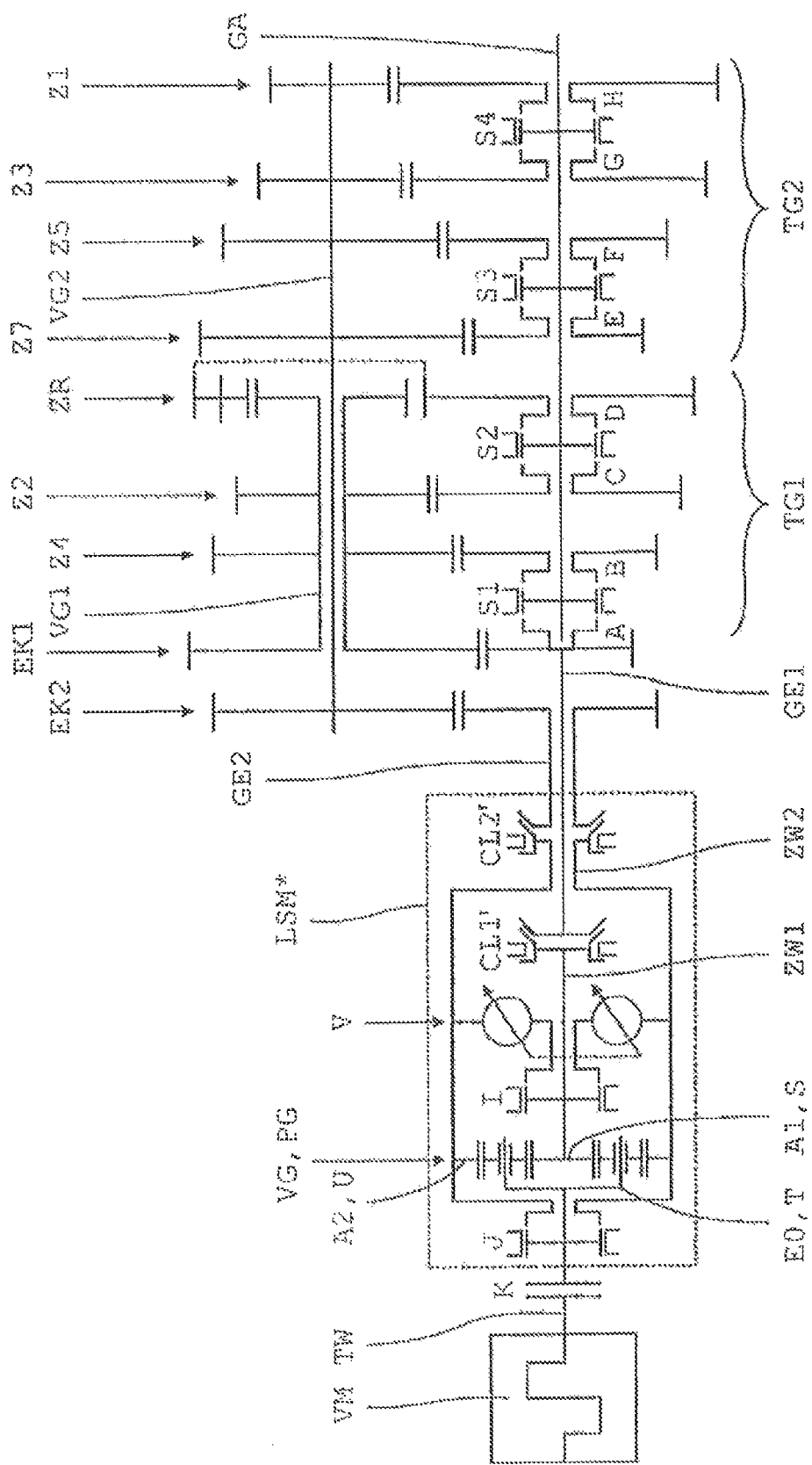

FIG. 3d shows schematically a third further development of the third embodiment of the powershift transmission according to FIG. 3a, which consists in that the two main separator clutches CL1', CL2' are this time in the form of frictionally synchronized synchronous clutches. This makes it possible, during a gearshift between an initially loaded gear and a target gear in different partial transmissions TG1, TG2 to carry out the synchronization of the main separator clutch (CL1' or CL2') of the powershift transmission (TG1 or TG2) comprising the target gear, which is done at the beginning, by compressing the friction elements of the main separator clutch (CL1' or CL2') concerned instead of by adjusting the transmission ratio of the variator V.

A further change compared with the third embodiment of the powershift transmission according to FIG. 3a, consists in that the variator V can be connected to and disconnected from the first intermediate shaft ZW1 by means of a separator clutch I, and the two intermediate shafts ZW1, ZW2 can be indirectly connected in a rotationally fixed manner to and disconnected from one another by means of a bridging clutch J, i.e. by a rotationally fixed connection of the input element E0 (planetary carrier T) of the transfer box VG (planetary gearset PG) to the second intermediate shaft ZW2. By disengaging the separator clutch I and engaging the bridging clutch J, in a load-carrying gear (G2, G4, G6 or R or else G1, G3, G5 or G7) of either partial transmission (TG1 or TG2), outside of shifting processes a permanent force flow via the variator V and an associated loss of efficiency can be avoided.

Figure 3E:
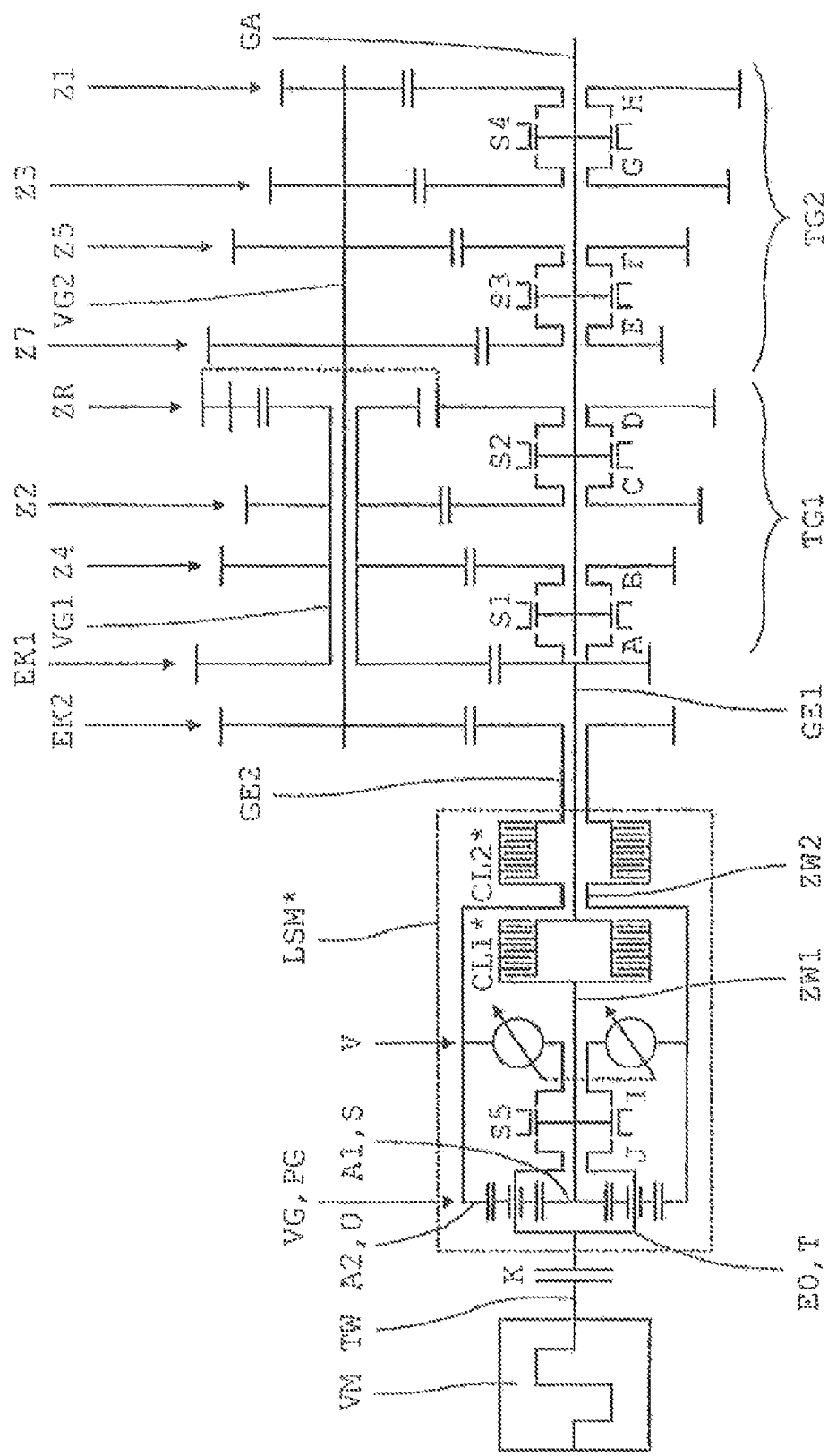

FIG. 3e shows schematically a further development of the embodiment of the powershift transmission according to FIG. 3d, which consists in that the two main separator clutches CL1*, CL2* are now in the form of disk clutches. As with the previously described variant, this makes it possible during a gearshift between an initially loaded gear and a target gear in different partial transmissions TG1, TG2, to carry out the synchronization of the main separator clutch (CL1* or CL2*) of the partial transmission (TG1 or TG2) that comprises the target gear, which is done at the beginning, by compressing together the friction elements of the main separator clutch (CL1* or CL2*) concerned, instead of by adjusting the transmission ratio of the variator V. Such a process sequence for the control of a gearshift carried out as a powershift, is described in detail below.

A further change compared with the previously described variant of the powershift transmission shown in FIG. 3d, consists in that the separator clutch I and the bridging clutch J are now combined in a dual shifting element S5, whereby compared with a separate arrangement of the clutches I, J, one clutch control element is saved. In contrast to the separate arrangement in FIG. 3d, however, the bridging clutch J is now arranged between the input element E0 (planetary carrier T) of the transfer box VG (planetary gearset PG) and the first intermediate shaft ZW1, but the bridging clutch J still performs the same function, namely to connect the two intermediate shafts ZW1, ZW2 in a rotationally fixed manner when it is engaged, by blocking the transfer box VG.

Below, with reference to FIGS. 4 to 12 typical gearshifts, each carried out as powershifts between an initially loaded gear and a target gear in different partial transmissions TG1, TG2, will be explained for all of the above-described embodiments and further developments of the powershift transmission designed according to the invention. For that purpose FIGS. 4 to 12 are each divided into five part-figures (for example FIGS. 4a to 4e), each being a time diagram, in which in the first part-figure (such as FIG. 4a) in each case the rotational speed variation $n_{VM}(t)$ of the drive engine VM or its driveshaft TW, the rotational speed variations $n_{ZW1}(t)$ and $n_{ZW2}(t)$ of the two intermediate shafts ZW1, ZW2, the rotational speed variations $n_{GE1}(t)$ and $n_{GE2}(t)$ of the two input shafts GE1, GE2, and the rotational speed variation $n_{GA}(t)$ of the output shaft GA during the gearshift process concerned are shown. The next two part-figures (such as FIGS. 4b and 4c) show, respectively, the shift condition of the two main separator clutches (CL1, CL2 or CL1*, CL2*) during the gearshift process concerned, wherein the disengaged or open condition is always denoted by a 0 and the engaged or closed condition always by a 1. The last two part-figures (such as FIGS. 4d and 4e) show the respective shift condition of the two gear clutches (B, F or B', F'; A, F or A', F'; C, G or C', G') involved in the gearshift during the gearshift process concerned, wherein once again the disengaged or open condition is always denoted by a 0 and the engaged or closed condition always by a 1.

FIGS. 4a to 4e show the sequence of a gearshift carried out as a powershift, which can be used in the powershift transmission according to FIG. 1a and the powershift transmission according to FIG. 2a, during a shift form an initially loaded gear in the first partial transmission TG1 to a target gear in the second partial transmission TG2. As an example, the gearshift portrayed is an upshift from the fourth gear G4 to the fifth gear G5.

Figure 4A:
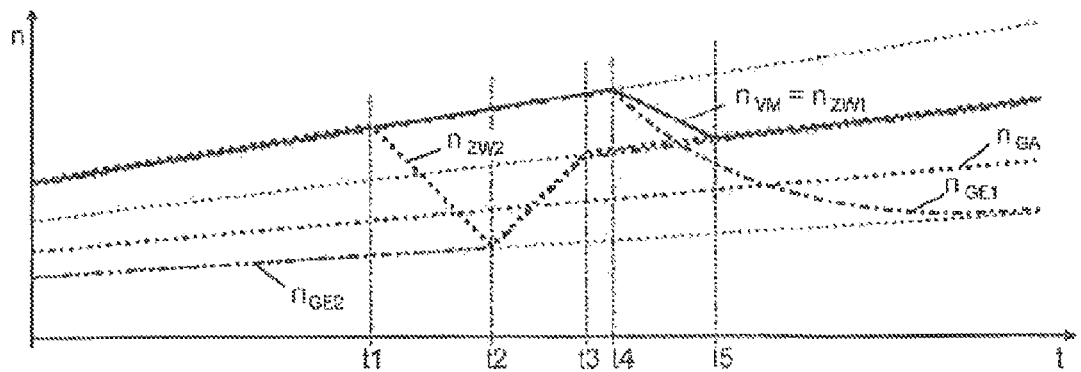
Figure 4B:
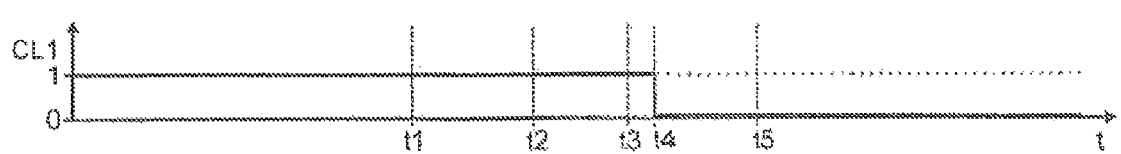
Figure 4C:
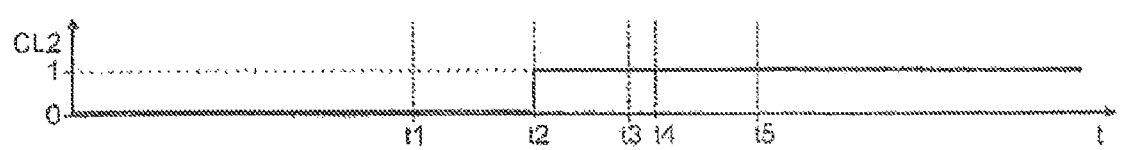
Figure 4D:
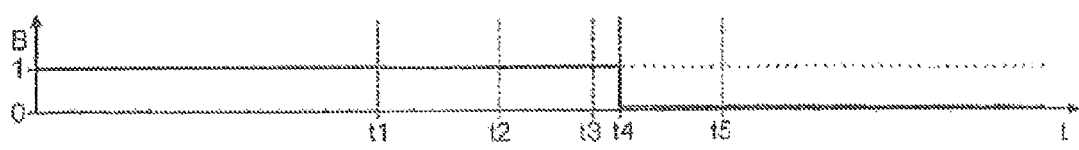
Figure 4E:
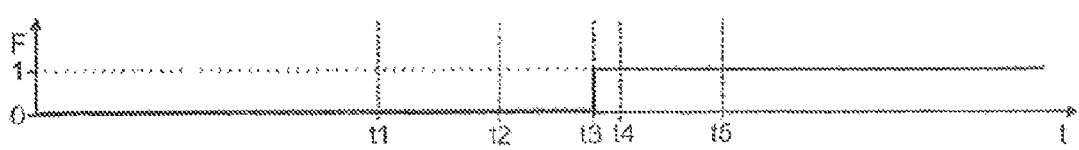
Figure 5A:
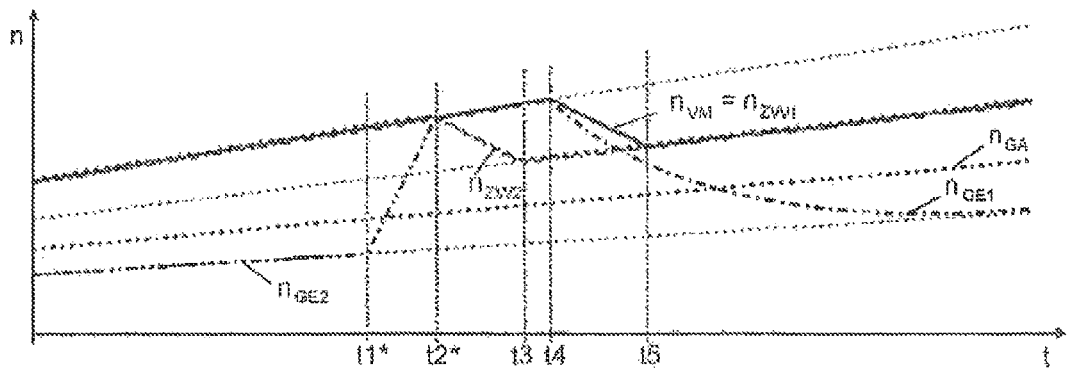
FIGS. 5a-5e: A shifting process of the powershift transmission shown in FIGS. 1d and 2e, controlled in accordance with the invention, represented in a time diagram.
Figure 5B:
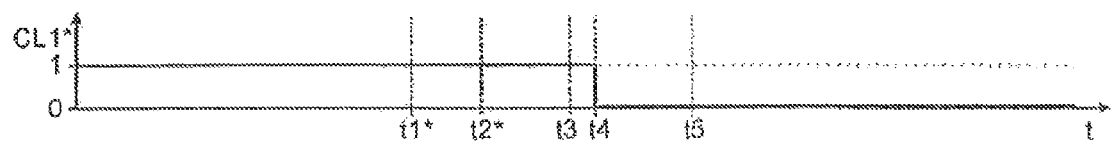
Figure 5C:
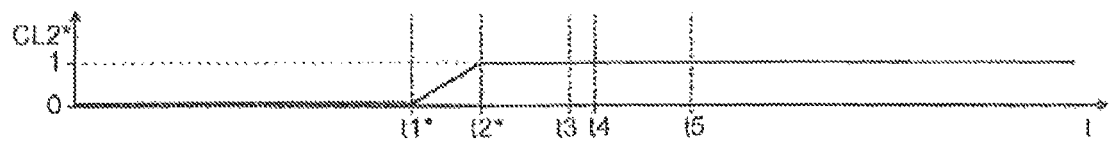
Figure 5D:
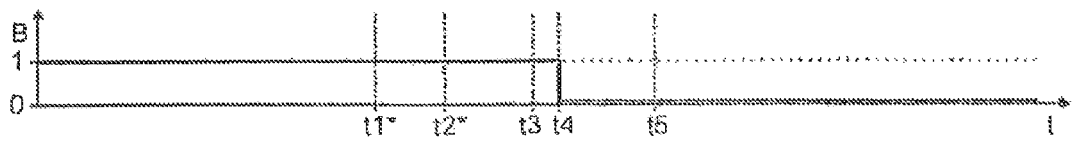
Figure 5E:
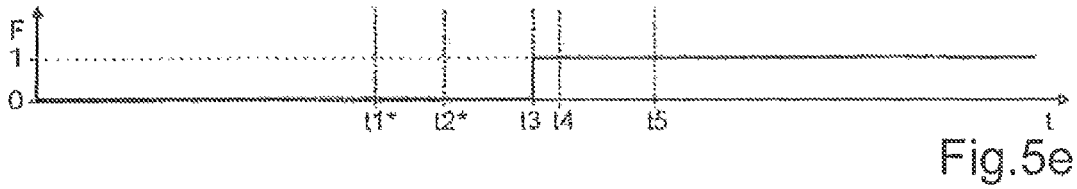

Between times t1 and t2 the second intermediate shaft ZW2 is slowed, by an appropriate transmission ratio adjustment of the variator V, i.e. by increasing the transmission ratio $i_V$ of the variator V defined between the first intermediate shaft ZW1 and the second intermediate shaft ZW2, down to the rotational speed $n_{GE2}$ of the second input shaft GE2 whereby the second main separator clutch CL2 is synchronized, which is then engaged at time t2 (FIGS. 4a, 4c). Until then the second input shaft GE2 rotated at a relatively low rotational speed under the action of drag torques, since until then it was not in driving connection either with the second intermediate shaft ZW2 or with the output shaft GA.

After coupling the second input shaft GE2 to the second intermediate shaft ZW2, the latter is accelerated by an appropriate transmission ratio adjustment of the variator V, i.e. by reducing the transmission ratio $i_V$ of the variator V, to the synchronous speed at the gear clutch F of the target gear G5. When the synchronous speed is reached at time t3 the gear clutch F of the target gear G5 is engaged (FIG. 4e), whereby the target gear G5 is engaged within the transmission. Thereafter, between times t3 and t4 the transmission ratio of the variator V is adjusted in the direction toward a higher ratio $i_V$, by virtue of which the first intermediate shaft ZW1 is relieved of the transmitted engine torque $M_{VM}$ and the second intermediate shaft ZW2 thereby takes up the load, i.e. the load is taken up by the second partial transmission TG2 or the target gear G5 from the first partial transmission TG1 or the originally loaded gear G4.

When freedom from load is reached at time t4, the first main separator clutch CL1 (FIG. 4b) and the gear clutch B of the originally loaded gear G4 (FIG. 4d) are disengaged, whereby the loaded gear G4 is disengaged within the transmission.

Thereafter, between times t4 and t5 the rotational speed is adapted, i.e. the drive engine UM is slowed down to the rotational speed of the second intermediate shaft ZW2 or the second input shaft GE2 coupled to it ($n_{ZW2}=n_{GE2}$), and at the same time the variator V is reset to its rest ratio ($i_{V\_0}=1$). During this, in order to avoid a torque collapse at the output shaft GA, which would be perceptible as a jerk, the rotational speed of the drive engine VM is adapted as much as possible so that the engine power, i.e. the product of the engine torque $M_{VM}$ and the engine rotational speed $n_{VM}$, is kept constant ($M_{VM}*n_{VM}$=const.). When the driveshaft TW of the drive engine VM and the two intermediate shafts ZW1, ZW2 are running synchronously, namely at time t5, the shifting process has ended. Meanwhile, the first input shaft GE1 which, since time t4, has no longer been coupled to the first intermediate shaft ZW1 and is no longer in driving connection with the output shaft GA, approaches a relatively low rotational speed where it is maintained under the action of drag torques.

The shifting process described can also be carried out in this form with the other variants of the powershift transmission concerned according to FIGS. 1b to 1d and 2b to 2e, even though the characteristic of friction-synchronization of the main separator clutches (CL1', CL2' or CL1*, CL2*) made as synchronous clutches or disk clutches in the variants shown in FIGS. 1c and 1d and in FIGS. 2d and 2e, and the corresponding characteristic of the gear clutches (A' to H') made as synchronous clutches in the variants shown in FIGS. 1b and 2b, are then not utilized.

FIGS. 5a to 5e now show the sequence of the same gearshift carried out as a powershift from the fourth gear G4 to the fifth gear G5, which can be used with the embodiment variant of the powershift transmission according to FIG. 1d and with the embodiment variant of the powershift transmission according to FIG. 2e, i.e. when the two main separator clutches CL1*, CL2* are in the form of disk clutches, during a shift from an initially loaded gear of the first partial transmission TG1 to a target gear of the second partial transmission TG2.

Between times t1* and t2* the second input shaft GE2, which to begin with rotates freely at a relatively low rotational speed, is accelerated by the continuous closing of the second main separator clutch CL2* (FIG. 5c) up to the rotational speed $n_{ZW2}$ of the second intermediate shaft ZW2 (FIG. 5a) and, when the synchronous rotational speed is reached at the second main separator clutch CL2*, namely at time t2*, the clutch is fully closed by over-compression. Thereafter, the second input shaft GE2 together with the second intermediate shaft ZW2 are slowed to the synchronous rotational speed at the gear clutch F of the target gear G5 by an appropriate transmission ratio adjustment of the variator V, i.e. by increasing the ratio $i_V$ of the variator. When the synchronous rotational speed is reached at time t3 the gear clutch F of the target gear G5 is engaged (FIG. 5e), whereby the target gear G5 is engaged within the transmission. The remainder of the shifting sequence (FIGS. 5a, 5d) corresponds to the sequence described earlier with reference to part-FIGS. 4a to 4e. The advantage of this process variant compared with the shifting sequence according to FIGS. 4a to 4e is that the relatively large transmission ratio adjustment required at the beginning of the shifting process in the latter case for synchronizing the second main separator clutch CL2, can in this case be avoided.

When, as in the embodiment variants of the powershift transmission shown in FIGS. 1c and 2d, the main separator clutch CL1' and CL2' are in the form of synchronous clutches, the above-described process variant can be carried out to a large extent identically. In such a case the second input shaft GE2 is accelerated between times t1* and t2* to the synchronous rotational speed by pressing together the friction elements of the second main separator clutch CL2', and the second main separator clutch CL2' is then engaged when the synchronous rotational speed is reached at time t2*.

Finally, FIGS. 6a to 6e show the sequence of the same gearshift carried out as a powershift, which can be used with the powershift transmission according to FIG. 1b and with the powershift transmission according to FIG. 2b, i.e. when the gear clutches A' to H' are made as frictionally synchronized synchronous clutches, for a gearshift from an initially loaded gear of the first partial transmission TG1 to a target gear of the second partial transmission TG2.

Figure 6A:
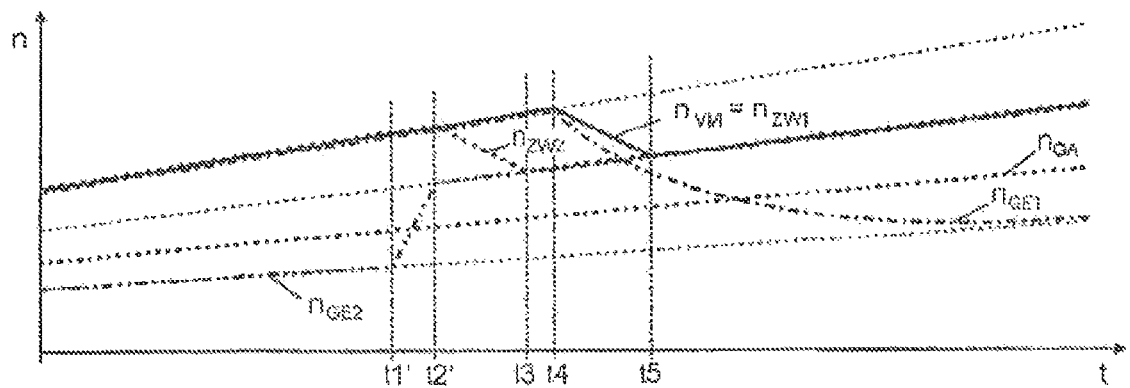
FIGS. 6a-6e: A controlled shifting process of the powershift transmission shown in FIGS. 1b and 2b, represented in a time diagram.
Figure 6B:
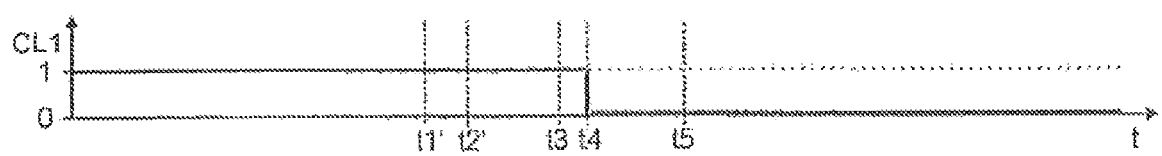
Figure 6C:
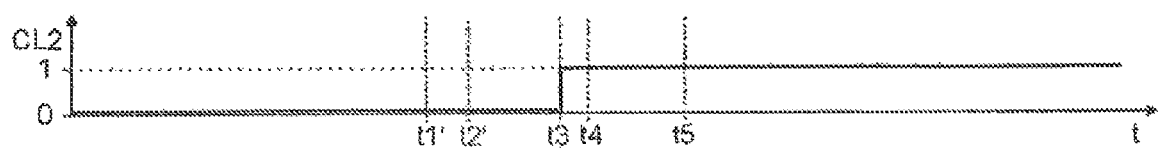
Figure 6D:
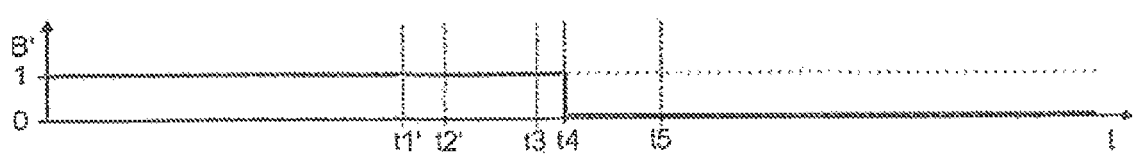
Figure 6E:
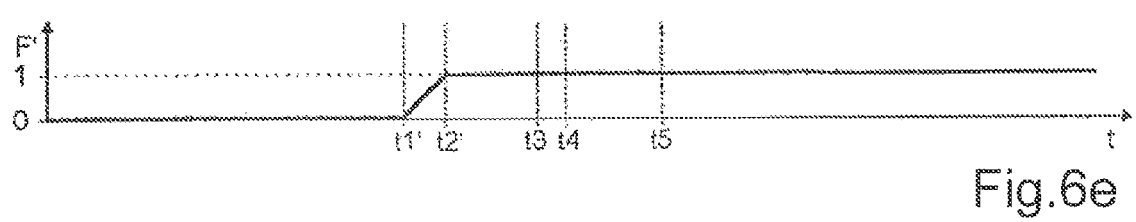

Between times t1' and t2' the second input shaft GE2, at first rotating freely at a relatively slow rotational speed, is now accelerated to the synchronous rotational speed of the gear clutch F' of the target gear G5 by pressing together the friction elements of the gear clutch F' (FIGS. 6a, 6e). When the synchronous rotational speed is reached at time t2', the gear clutch F' of the target gear G5 is engaged, whereby the target gear G5 is engaged within the transmission. Thereafter, by an appropriate transmission ratio adjustment of the variator V, i.e. by increasing the ratio $i_V$ of the variator, the second intermediate shaft ZW2 is slowed to the rotational speed of the second input shaft GE2 and thereby the second main separator clutch CL2 is synchronized, which is then engaged at time t3 (FIG. 6c). The remainder of the shifting sequence corresponds to the sequence described earlier with reference to part-FIGS. 4a to 4e and 5a to 5e (see here FIGS. 6a to 6e). Thus, in this process variant the synchronization sequence of the second main separator clutch CL2 and the gear clutch F' of the target gear G5 is exchanged compared with the two previously described process variants. Compared with the shifting sequence according to FIGS. 4a to 4e, the present process variant also has the advantage that the relatively large transmission ratio adjustment of the variator V required at the beginning of the shifting process in the variant according to FIGS. 4a to 4e in order to synchronize the second main separator clutch CL2, can be avoided.

Since in the first and second embodiments of the powershift transmission shown, respectively, in FIGS. 1a and 2a, in contrast to the second intermediate shaft ZW2 it is the first intermediate shaft ZW1 which is in each case connected directly and rotationally fixed to the driveshaft TW of the drive engine VM, a gearshift carried out as a powershift from an initially loaded gear of the second partial transmission TG2 to a target gear of the first partial transmission TG1 necessarily takes place otherwise than in the reverse shifting direction.

Accordingly, FIGS. 7a to 7e show the sequence of a gearshift carried out as a powershift, which can be used in the powershift transmission shown in FIG. 1a and in the powershift transmission shown in FIG. 2a during a gearshift from an initially loaded gear of the second partial transmission TG2 to a target gear of the first partial transmission TG1. The shift described is, for example, an upshift from the fifth gear G5 to the sixth gear G6.

Figure 7A:
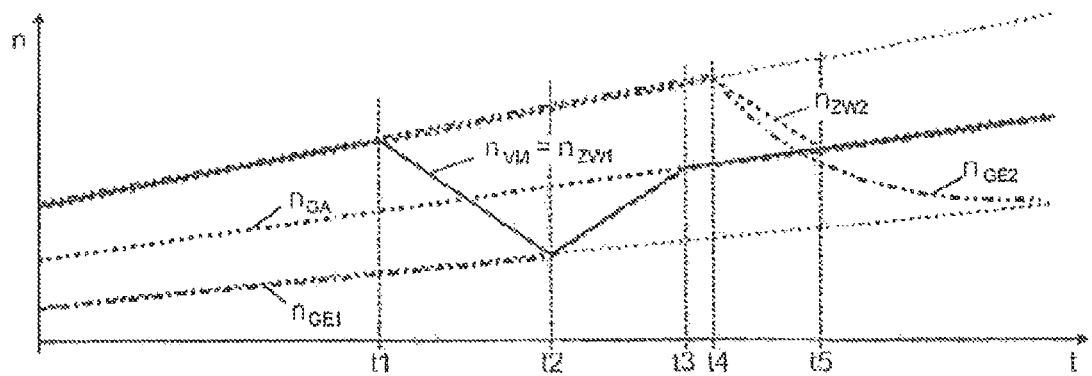
FIGS. 7a-7e: A further controlled shifting process of the powershift transmission shown in FIGS. 1a and 2a, represented in a time diagram.
Figure 7B:
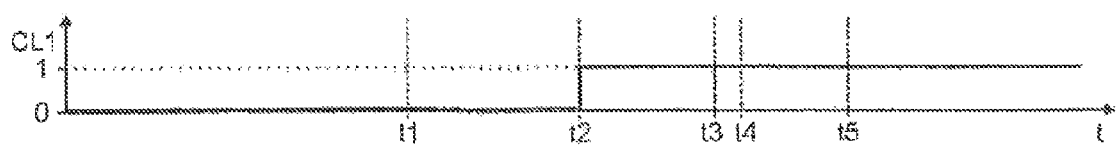

Between times t1 and t2 the first intermediate shaft ZW1, which is connected in a rotationally fixed manner to the driveshaft TW of the drive engine VM, in combination with a simultaneous rotational speed adaptation of the engine VM by an appropriate transmission ratio adjustment of the variator V, i.e. by reducing the ratio $i_V$ of the variator V defined between the first intermediate shaft ZW1 and the second intermediate shaft ZW2, is slowed to the rotational speed $n_{GE1}$ of the first input shaft GE1, and thus the first main separator clutch CL1 is synchronized and is engaged at time t2 (FIG. 7b). Until then the first input shaft GE1 was rotating under the action of drag torques at a relatively slow rotational speed since until then it was neither coupled to the first intermediate shaft ZW1, nor was it in driving connection with the output shaft GA. In order during this to avoid a torque collapse at the output shaft GA that would be perceptible as a jerk, the rotational speed adaptation of the drive engine VM is carried out in such manner that the engine power, i.e. the product of the engine torque $M_{VM}$ and the engine rotational speed $n_{VM}$, is kept constant ($M_{VM}*n_{VM}$=const.).

When the first input shaft GE1 has been coupled to the first intermediate shaft ZW1, in combination with a simultaneous rotational speed adaptation of the drive engine VM by an appropriate transmission ratio adjustment of the variator V, i.e. by increasing the transmission ratio $i_V$ of the variator V, the first intermediate shaft ZW1 is accelerated to the synchronous rotational speed at the gear clutch A of the target gear G6. When the synchronous rotational speed is reached at time t3 the gear clutch A of the target gear G6 is engaged, whereby the target gear G6 is engaged within the transmission (FIG. 7d). Thereafter, between times t3 and t4, by means of a slight transmission ratio adjustment of the variator V in the direction toward a lower ratio $i_V$, by virtue of which the second intermediate shaft ZW2 is relieved of the transmitted engine torque $M_{VM}$ and the first intermediate shaft ZW1 correspondingly takes up the load, the load is taken up by the first partial transmission TG1 or the target gear G6 from the second partial transmission TG2 or the originally loaded gear G5.

Figure 7C:
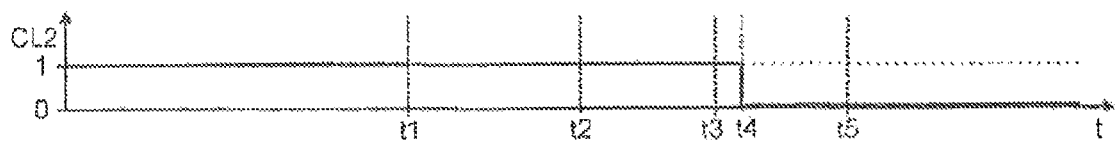
Figure 7D:
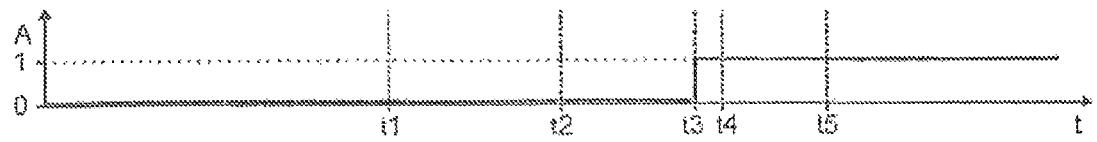
Figure 7E:
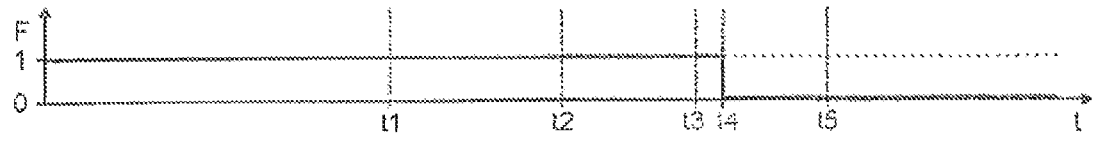

When the second intermediate shaft ZW2 becomes free from load, which happens at time t4, the second main separator clutch CL2 and the gear clutch F of the originally loaded gear G5 are disengaged, whereby the loaded gear G5 is disengaged within the transmission (FIGS. 7c, 7e).

Thereafter, between times t4 and t5 the variator V is reset to its rest transmission ratio ($i_{V\_0}$=1), whereby the load-free second intermediate shaft ZW2 is slowed to the rotational speed $n_{ZW1}=n_{VM}$ of the first intermediate shaft ZW1 and the drive engine VM and its driveshaft TW. A rotational speed adaptation of the drive engine VM is now no longer needed, since this has already taken place completely. When the variator V reaches its rest ratio ($i_{V\_0}$=1) at time t5, the shifting process is completed (FIG. 7a). Meanwhile the second input shaft GE2, which since time t4 is no longer coupled to the second intermediate shaft ZW2 and is no longer in driving connection with the output shaft GA, approaches a relatively low rotational speed at which it is maintained under the action of drag torques.

The shifting process described can also be carried out in this form with the other variants of the powershift transmission concerned and shown in FIGS. 1b to 1d, 2b to 2e, even if the characteristic of frictional synchronization of the main separator clutches (CL', CL2' or CL1*, CL2*) made as synchronous clutches or disk clutches, respectively, in the variants according to FIGS. 1c and 1d and FIGS. 2d and 2e, and the corresponding characteristics of the gear clutches (A' to H') made as synchronous clutches in the variants shown in FIGS. 1b and 2b, are not utilized.

FIGS. 8a to 8e now show the sequence of the same gearshift carried out as a powershift, during a shift from an initially loaded gear in the second partial transmission TG2 to a target gear in the first partial transmission TG1, for the case of the powershift transmission according to FIG. 1d and the powershift transmission according to FIG. 2e, i.e. when the two main separator clutches CL1*, CL2* are in the form of disk clutches.

Figure 8A:
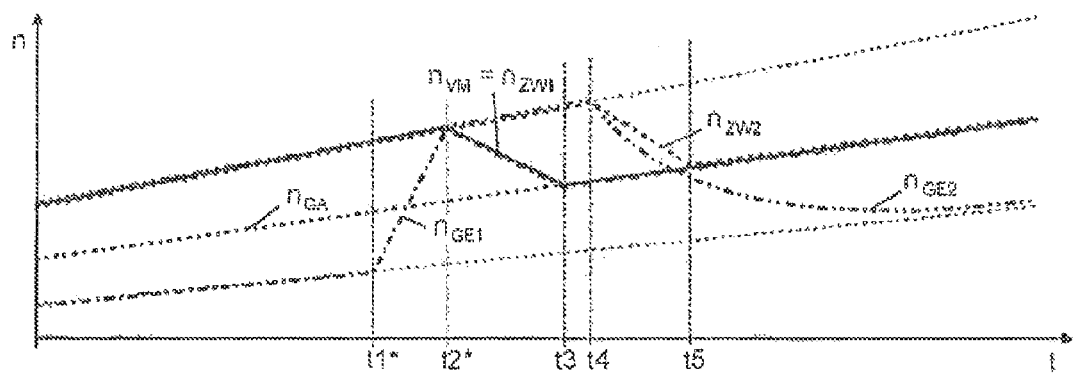
FIGS. 8a-8e: A further controlled shifting process of the powershift transmission shown in FIGS. 1d and 2e, represented in a time diagram.
Figure 8B:
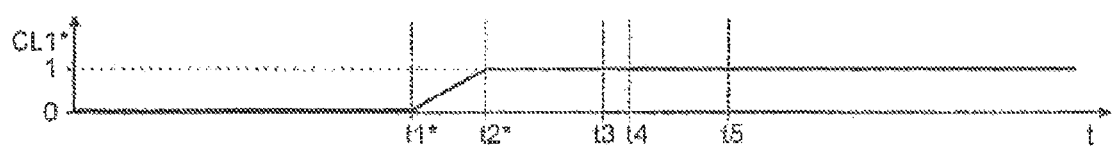
Figure 8C:
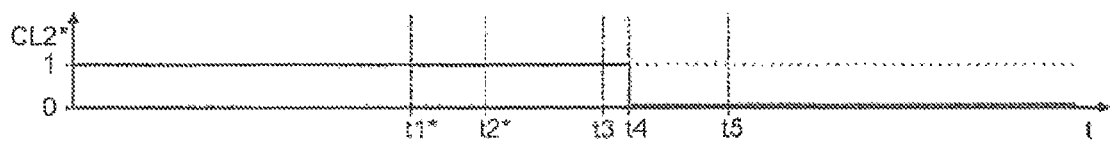
Figure 8D:
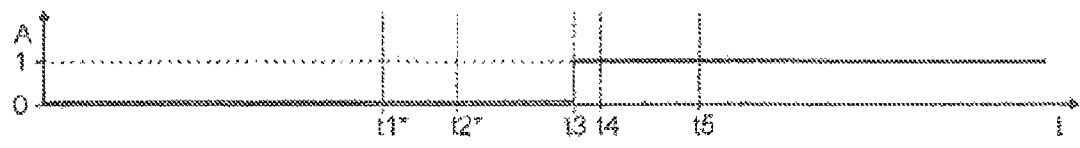
Figure 8E:
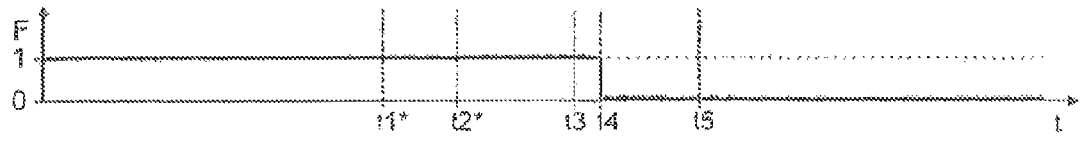

Between times t1* and t2* the first input shaft GE1, which to begin with rotates freely at a relatively low rotational speed, is accelerated by the continuous closing of the first main separator clutch CL1* to the rotational speed $n_{ZW1}$ of the first intermediate shaft ZW1 and when the synchronous rotational speed is reached at the first main separator clutch CL1* at time t2*, the clutch is fully closed by compression (FIGS. 8a, 8b). Thereafter the first input shaft GE1 together with the first intermediate shaft ZW1, in combination with a simultaneous rotational speed adaptation of the drive engine VM by an appropriate transmission ratio adjustment of the variator V, i.e. by reducing the ratio $i_V$ of the variator V, are slowed down to the synchronous rotational speed of the gear clutch A of the target gear G6. When the synchronous rotational speed is reached at time t3 the gear clutch A of the target gear G6 is engaged, whereby the target gear G6 is engaged within the transmission (FIGS. 8a, 8d). The remainder of the shifting sequence corresponds to the sequence described previously with reference to part-FIGS. 7a to 7e (see FIGS. 8a to 8e). The advantage of this process variant compared with the shifting sequence shown in FIGS. 7a to 7e is that the relatively large transmission ratio adjustment of the variator V required at the beginning of the shifting process in the latter case for the synchronization of the main separator clutch CL1, can be avoided.

When in accordance with the variants of the powershift transmission shown in FIGS. 1c and 2d the two main separator clutches CL1', CL2' are in the form of synchronous clutches, this process variant can be carried out in a largely identical manner. In that case between times t1* and t2* the first input shaft GE1 is accelerated to the synchronous rotational speed of the first main separator clutch CL1' by pressing the friction elements of the clutch together, and when the synchronous rotational speed has been reached at time t2* the main separator clutch CL1' is engaged.

Finally, FIGS. 9a to 9e show the sequence of the same gearshift carried out as a powershift, that can be used with the powershift transmission of FIG. 1b and the powershift transmission of FIG. 2b, i.e. when the gear clutches A' to H' are in the form of frictionally synchronized synchronous clutches, for a shift from an initially loaded gear of the second partial transmission TG2 to a target gear of the first partial transmission TG1.

Figure 9A:
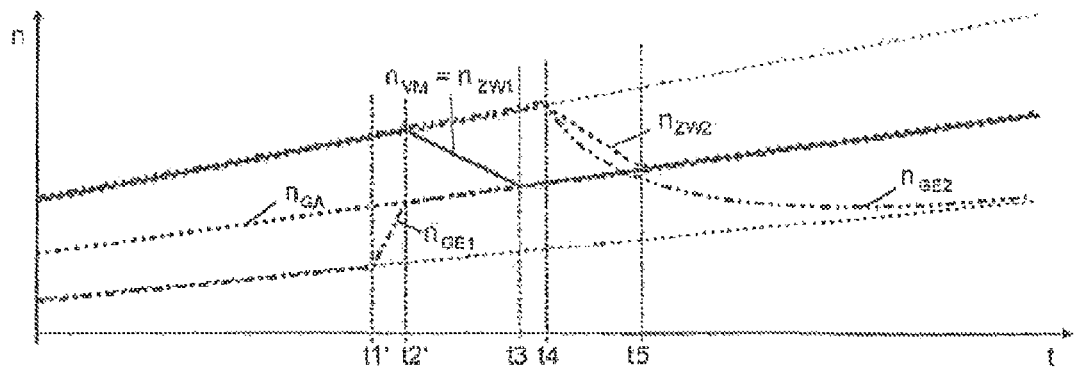
FIGS. 9a-9e: A further controlled shifting process of the powershift transmission shown in FIGS. 1b and 2b, represented in a time diagram.
Figure 9B:
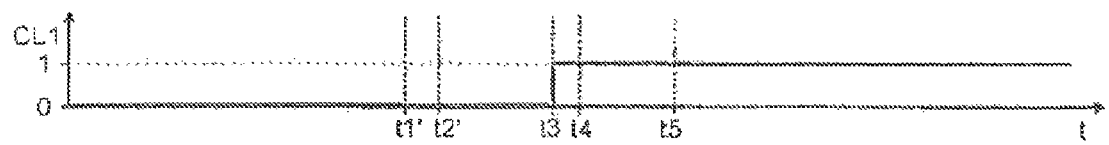
Figure 9C:
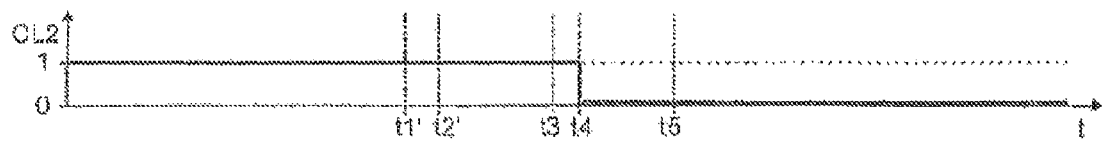
Figure 9D:
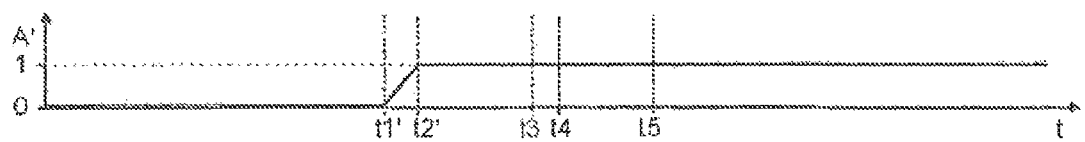
Figure 9E:
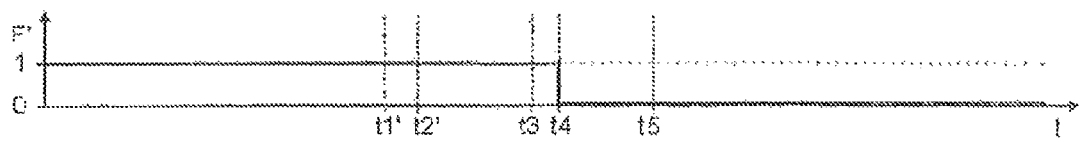

Between times t1' and t2' the first input shaft GE1, initially rotating at a relatively low rotational speed, is now accelerated, by pressing together the friction elements of the gear clutch A' of the target gear G6, to the synchronous rotational speed of the gear clutch A' (FIGS. 9a, 9d). When the synchronous rotational speed is reached at time t2' the gear clutch A' of the target gear G6 is engaged, whereby the target gear G6 is engaged within the transmission (FIG. 9d). Thereafter, in combination with a simultaneous rotational speed adaptation of the drive engine VM by an appropriate transmission ratio adjustment of the variator V, i.e. a reduction of the ratio $i_V$ of the variator V, the first intermediate shaft ZW1 is slowed down to the rotational speed $n_{GE1}$ of the first input shaft GE1 and the first main separator clutch CL1 is thus synchronized and engaged at time t3 (FIG. 9b). The remainder of the shifting sequence corresponds to the sequence described earlier with reference to part-FIGS. 7a to 7e and 8a to 8e (see FIGS. 9a to 9e). Thus, in the present process variant, compared with the two process variants described above the synchronization sequence of the first main separator clutch CL1 and the gear clutch A' of the target gear G6 is reversed. Compared with the shifting sequence according to FIG. 7, the present process variant also has the advantage that the relatively large transmission ratio adjustment of the variator V required at the beginning of the shifting process for synchronizing the first main separator clutch CL1, can be avoided.

In the powershift transmission according to FIG. 3a the two intermediate shafts ZW1, ZW2 are in driving connection with the driveshaft TW of the drive engine VM via the transfer box VG in a symmetrical arrangement. Thus, a gearshift carried out as a powershift from an initially loaded gear of the first partial transmission TG1 to a target gear in the second partial transmission TG2 takes place, in principle, in the same manner as a gearshift carried out as a powershift from an initially loaded gear of the second partial transmission TG2 to a target gear of the first partial transmission TG1. On the other hand, in this embodiment of the powershift transmission a transmission ratio adjustment of the variator V is always connected with a rotational speed change of the drive engine VM and its driveshaft TW when, during this, the rotational speed ($n_{ZW1}$ or $n_{ZW2}$) of one of the two intermediate shafts (ZW1 or ZW2) is kept substantially constant.

Accordingly, FIGS. 10a to 10e shows the sequence of a gearshift carried out as a powershift, which can be used with the powershift transmission shown in FIG. 3a, for a shift from an initially loaded gear in one of the partial transmissions (TG1 or TG2) to a target gear in the other partial transmission (TG2 or TG1), i.e. in both shifting directions. The shift described is, as an example, a downshift from the third gear G3 to the second gear G2, i.e. a shift from an initially loaded gear (G3) of the second partial transmission TG2 to a target gear (G2) of the first partial transmission TG1.

Figure 10A:
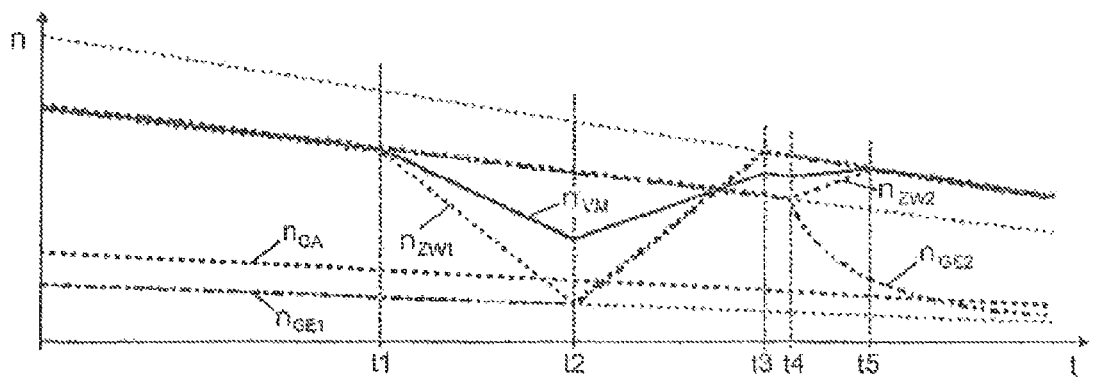
FIG. 10a-10e: A controlled shifting process of the powershift transmission shown in FIG. 3a, represented in a time diagram.
Figure 10B:

Between times t1 and t2 the first intermediate shaft ZW1, which is in driving connection via the transfer box VG with the driveshaft TW of the drive engine VM, in combination with a simultaneous rotational speed adaptation of the engine VM by means of an appropriate transmission ratio adjustment of the variator V, i.e. by reducing the ratio $i_V$ of the variator V defined between the first and second intermediate shafts ZW1, ZW2, is slowed down to the rotational speed $n_{GE1}$ of the first input shaft GE1 and the first main separator clutch CL1 is thus synchronized and engaged at time t2 (FIG. 10b). Until then the first input shaft GE1 was rotating under the action of drag torques at a relatively low rotational speed, since until then it was neither coupled to the first intermediate shaft ZW1 nor was it in driving connection with the output shaft GA. In order during this to avoid a torque collapse at the output shaft GA which would be perceived as a jerk, the rotational speed adaptation of the engine VM is carried out as much as possible in such manner that the engine power, i.e. the product of the engine torque $M_{VM}$ and the engine rotational speed $n_{VM}$, is kept constant ($M_{VM}*n_{VM}$=const.).

After coupling the first input shaft GE1 to the first intermediate shaft ZW1, in combination with a simultaneous rotational speed adaptation of the engine VM by means of an appropriate transmission ratio adjustment of the variator V, i.e. by increasing the ratio $i_V$ of the variator, the first intermediate shaft ZW1 is accelerated to the synchronous rotational speed of the gear clutch C of the target gear G2. When the synchronous rotational speed is reached at time t3 the gear clutch C of the target gear G2 is engaged, whereby the target gear G2 is engaged within the transmission (FIGS. 10, 10d). Thereafter, between times t3 and t4 a slight transmission ratio adjustment of the variator V in the direction toward a lower ratio $i_V$ relieves the second intermediate shaft ZW2 from the transmitted engine torque $M_{VM}$, whereas the first intermediate shaft ZW1 takes up the load, completing the load uptake by the first partial transmission TG1 or its target gear G2 from the second partial transmission TG2 or its originally loaded gear G3 (FIG. 10a).

Figure 10C:
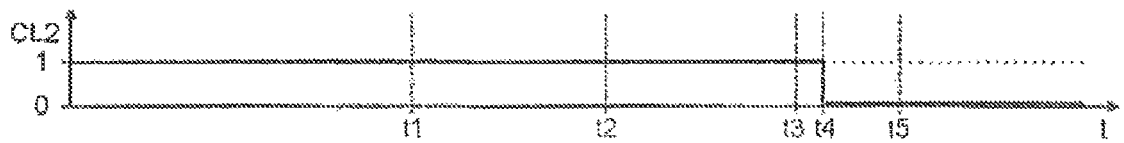
Figure 10D:
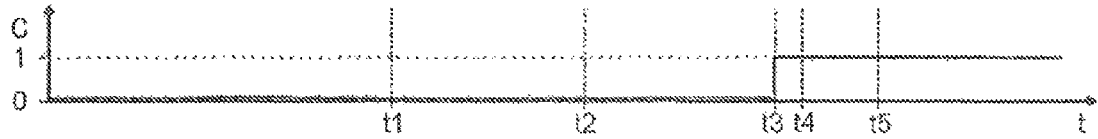
Figure 10E:
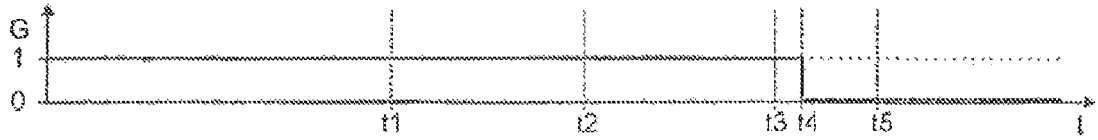

When the second intermediate shaft ZW2 has become free from load at time t4, the second main separator clutch CL2 and the gear clutch G of the initially loaded gear G2 are disengaged, whereby the initially loaded gear G2 is disengaged within the transmission (FIGS. 10c, 10e).

Thereafter, between times t4 and t5, in combination with a simultaneous rotational speed adaptation of the drive engine VM the variator V is reset to its rest transmission ratio ($i_{V\_0}=1$), whereby the load-free second intermediate shaft ZW2 is accelerated to the rotational speed $n_{ZW1}$ of the first intermediate shaft ZW1 (FIG. 10a). When the variator V reaches its rest ratio ($i_{V\_0}=1$) at time t5, the shifting process has ended. Meanwhile the second input shaft GE2, which since time t4 has no longer been coupled to the second intermediate shaft ZW2 and is no longer in driving connection with the output shaft GA, approaches a relatively low rotational speed at which it is kept by the action of drag torques.

The shifting process just described can also be carried out in this form with the other variants of the powershift transmission concerned according to FIGS. 3b to 3e, even if then the characteristic of frictional synchronization of the main separator clutches (CL1', CL2' or CL1*, CL2*) made as synchronous clutches or disk clutches, respectively, in the variants shown in FIGS. 3d and 3e, and the corresponding characteristic of the gear clutches (A' to H') made as synchronous clutches in the variant shown in FIG. 3b, are not utilized.

FIGS. 11a to 11e show the sequence for the same gearshift carried out as a powershift, which can be used with the powershift transmission according to FIG. 3a, i.e. when the two main separator clutches CL1*, CL2* are in the form of disk clutches, during a shift from an initially loaded gear of one partial transmission (TG1 or TG2) to a target gear of the other partial transmission (TG2 or TG1).

Figure 11A:
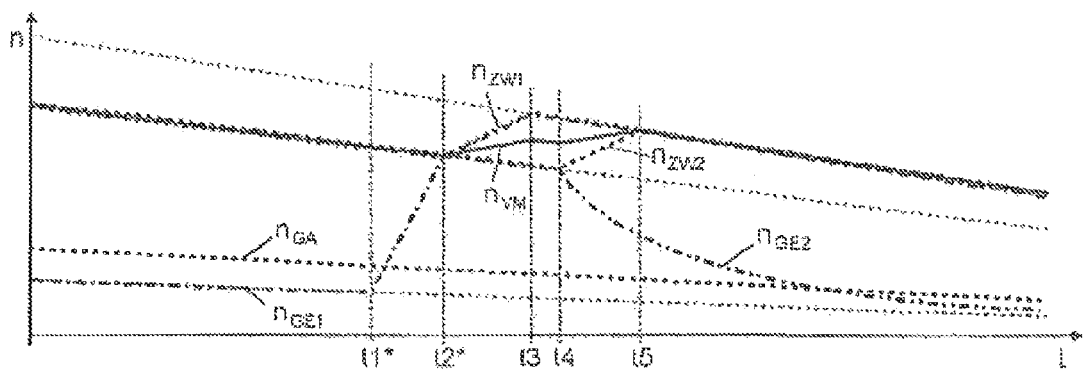
FIG. 11a-11e: A controlled shifting process of the powershift transmission shown in FIG. 3e, represented in a time diagram.
Figure 11B:
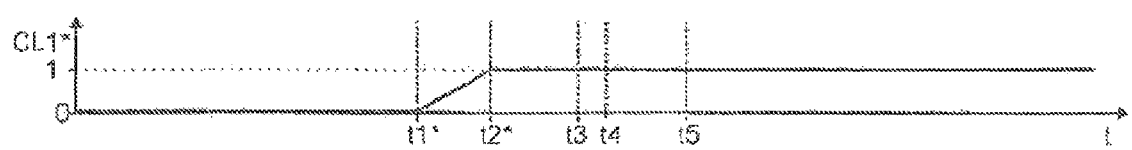
Figure 11C:
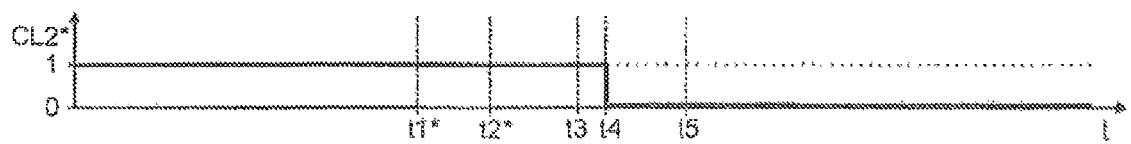
Figure 11D:
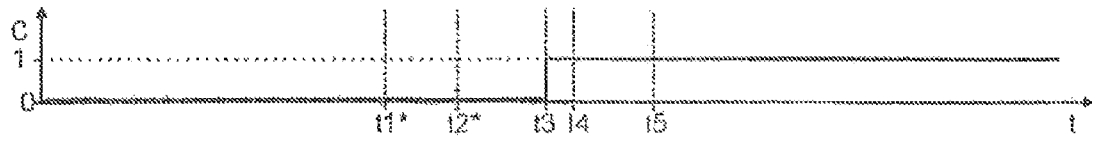
Figure 11E:
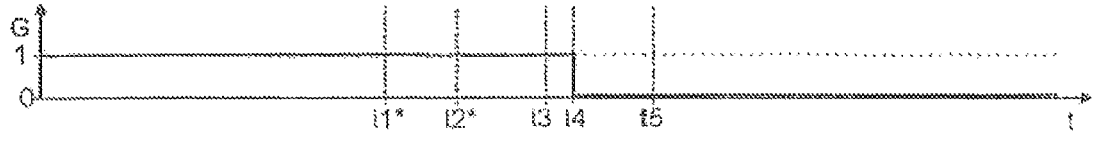

Between times t1 and t2* the first input shaft GE1, which initially rotates freely at a relatively low rotational speed, is now accelerated by the continuous closing of the first main separator clutch CL1* to the rotational speed $n_{ZW1}$ of the first intermediate shaft ZW1 and when the synchronous rotational speed is reached at the first main separator clutch CL1* at time t2*, the clutch is fully closed by compression (FIGS. 11a, 11b). Thereafter the first input shaft GE1 together with the first intermediate shaft ZW1, in combination with a simultaneous rotational speed adaptation of the drive engine VM by means of an appropriate transmission ratio adjustment of the variator V, i.e. by increasing the ratio $i_V$ of the variator V, are accelerated to the synchronous rotational speed at the gear clutch C of the target gear G2. When the synchronous rotational speed is reached at time t3, the gear clutch C of the target gear G2 is engaged, whereby the target gear G2 is engaged within the transmission (FIG. 11c). The remainder of the shifting sequence corresponds to the sequence described above with reference to part-FIGS. 10a to 10e (see FIGS. 11a to 11e). Compared with the shifting sequence according to FIG. 10, the advantage of the present process variant is that the relatively large transmission ratio adjustment of the variator V required at the beginning in that case for synchronizing the first main separator clutch CL1, can be avoided.

If, as in the variant of the powershift transmission according to FIG. 3d, the main separator clutches CL1', CL2' are in the form of synchronous clutches, the present process variant can be carried out in a largely identical manner. Between times t1* and t2* the first input shaft GE1 is accelerated, by compressing the friction elements of the first main separator clutch CL1', to the synchronous rotational speed and when this is reached at time t2*, the first separator clutch CL1' is engaged.

Finally, FIGS. 12a to 12e show the sequence for the same gearshift carried out as a powershift, which can be used with the powershift transmission according to FIG. 3b, i.e. when the gear clutches A' to H' are in the form of frictionally synchronized synchronous clutches, for shifting from an initially loaded gear of one partial transmission (TG1 or TG2) to a target gear of the other partial transmission (TG2 or TG1).

Figure 12A:
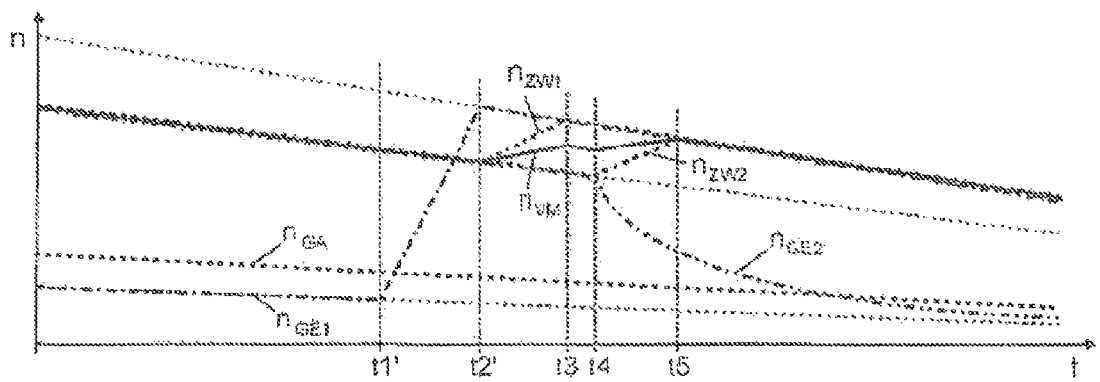
FIG. 12a-12e: A controlled shifting process of the powershift transmission shown in FIG. 3b, represented in a time diagram.
Figure 12B:
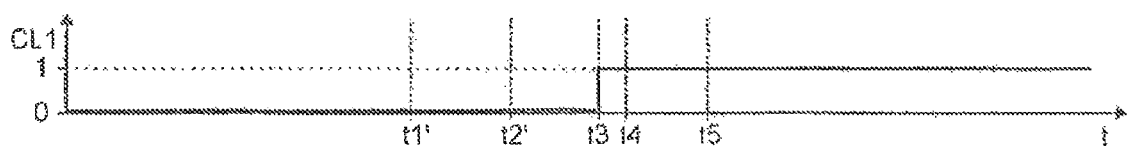
Figure 12C:
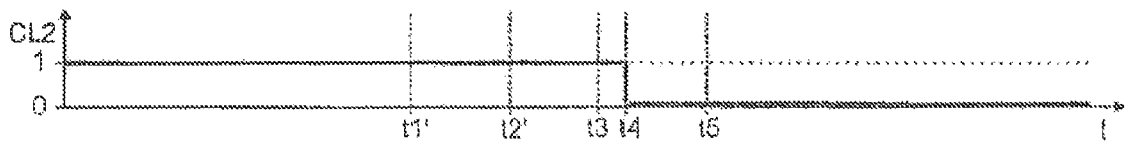
Figure 12D:
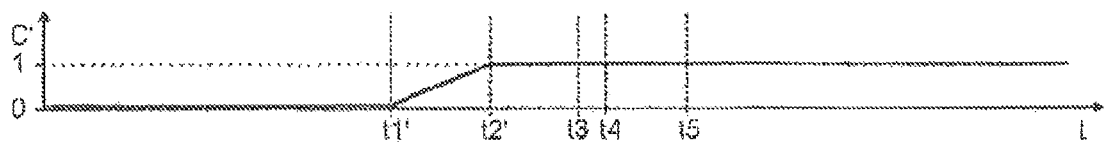
Figure 12E:
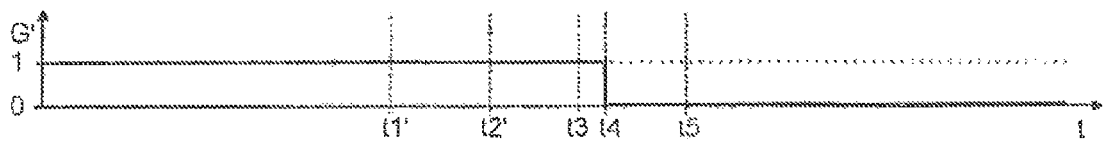

Between times t1' and t2' the first input shaft GE1, initially rotating freely at a relatively low rotational speed, is accelerated by pressing together the friction elements of the gear clutch C' of the target gear G2 to the synchronous rotational speed of the gear clutch C' (FIGS. 12a, 12d). When the synchronous rotational speed is reached at time t2' the gear clutch C' of the target gear G2 is engaged, whereby the target gear G2 is engaged within the transmission (FIG. 12d). Thereafter, in combination with a simultaneous rotational speed adaptation of the drive engine VM by an appropriate transmission ratio adjustment of the variator, i.e. by increasing the ratio $i_V$ of the variator, the first intermediate shaft ZW1 is accelerated to the rotational speed $n_{GE1}$ of the first input shaft GE1 and thereby the first main separator clutch CL1 is synchronized, and then engaged at time t3 (FIG. 12b). The remainder of the shifting sequence corresponds to the sequence described earlier with reference to part-FIGS. 10a to 10e and 11a to 11e (see FIGS. 12a to 12e). Thus, in the present process variant, compared with the two previously described process variants the synchronization sequence of the main separator clutch CL1 and the gear clutch C' of the target gear G2 is reversed. Compared with the shifting sequence according to FIG. 10, the present process variant has the advantage that the relatively large transmission ratio adjustment of the variator V required at the beginning of the shifting process in that case for synchronizing the first main separator clutch CL1, can be avoided.

INDEXES

A-H Gear clutches, claw clutches
A'-H' Gear clutches, synchronous clutches
A0 Output element of the superposition gearset SG
A1 First output element of the transfer box VG
A2 Second output element of the transfer box VG
CL1 First main separator clutch, claw clutch
CL1' First main separator clutch, synchronous clutch
CL1* First main separator clutch, disk clutch
CL2 Second main separator clutch, claw clutch
CL2' Second main separator clutch, synchronous clutch
CL2* Second main separator clutch, disk clutch
E0 Input element of the transfer box VG
E1 First output element of the superposition gearset SG
E2 Second output element of the superposition gearset SG
EK1 First input constant
EK2 Second input constant G1-G7 Gear steps, forward gears
GA Output shaft
GE1 First input shaft
GE2 Second input shaft
I Separator clutch at the variator V
$i_{G\_n}$ Gear ratio of the n-th gear
$i_{G\_n+1}$ Gear ratio of the (n+1)-th gear
$i_V$ Transmission ratio of the variator V
$i_{V\_0}$ Rest transmission ratio of the variator V
$i_{V\_max}$ Highest transmission ratio of the variator V
$i_{V\_min}$ Lowest transmission ratio of the variator V
J Bridging clutch at the variator V
K Starting clutch
LSM Powershift module
LSM' Powershift module
LSM* Powershift module
$M_{VM}$ Engine torque, torque from the internal combustion engine VM
n Rotational speed
$n_{GA}$ Rotational speed of the output shaft GA
$n_{GE1}$ Rotational speed of input shaft GE1
$n_{GE2}$ Rotational speed of input shaft GE2
$n_{ZW1}$ Rotational speed of intermediate shaft ZW1
$n_{ZW2}$ Rotational speed of intermediate shaft ZW2
$n_{VM}$ Engine rotational speed, rotational speed of the driveshaft TW
PG Planetary gearset
R Gear step, reversing gear
S Sun gear of the planetary gearset PG
S1-S5 Coupling shifting elements
SG Superposition gearset, summation gearset
t Time
t1-t5 Time points
t1', t2' Time points
t1*, t2* Time points
T Planetary carrier of the planetary gearset PG
TG1 First partial transmission
TG2 Second partial transmission
TW Driveshaft of the internal combustion engine VM
U Ring gear of the planetary gearset PG
V Variator
VG Transfer box, differential transmission
VG1 First countershaft
VG2 Second countershaft
VM Drive engine, internal combustion engine
Z1-Z5 Spur gear stages
Z7 Seventh spur gear stage
ZR Reversing spur gear stage
ZW1 First intermediate shaft
ZW2 Second intermediate shaft
$\Delta n_{ZW}$ Rotational speed difference between ZW1 and ZW2
$\phi_{max}$ Maximum gear interval of G1-G7

The invention claimed is:
1. A powershift transmission, of a motor vehicle, comprising:
two partial transmissions (TG1, TG2) each with a respective input shaft (GE1, GE2), each of the input shafts, on an input side, being in driving connection with a driveshaft (TW) of a drive engine (VM) by way of a main separator clutch (CL1, CL2; CL1', CL2'; CL1*, CL2*), and, on an output side, with a common output shaft (GA) by way of a plurality of selectively engagable gear steps (G1 to G7, R) having different gear ratios,
the two input shafts (GE1, GE2), on the input side, being connected to and disconnected from first and second intermediate shafts (ZW1, ZW2) respectively by the respective main separator clutch (CL1, CL2; CL1', CL2'; CL1*, CL2*),
the first intermediate shaft (ZW1) being directly connectable, in a rotationally fixed manner, to the driveshaft (TW) of the drive engine (VM), and
the second intermediate shaft (ZW2) being in driving connection with the first intermediate shaft (ZW1) by way of a variator (V) with a continuously adjustable transmission ratio ($i_V$) and a rest transmission ratio having a value of one ($i_{V\_0}=1$).

2. The powershift transmission according to claim 1, wherein the two main separator clutches (CL1, CL2; CL1', CL2'; CL1*, CL2*), the first and the second intermediate shafts (ZW1, ZW2) and the variator (V) are combined in a pre-assembled powershift module (LSM).

3. The powershift transmission according to claim 1, wherein the variator (V) has an adjustment range whose highest transmission ratio ($i_{V\_max}$) corresponds to at least a maximum gear interval ($\phi_{max}=(i_{G\_n}/i_{G\_n+1})_{max}$) of the gear steps (G1 to G7), and whose lowest transmission ratio ($i_{V\_min}$) corresponds to at least a reciprocal of the maximum gear interval ($\phi_{max}$) of the gear steps (G1 to G7) ($i_{V\_max} \geq \phi_{max}$, $i_{V\_min} \leq 1/\phi_{max}$).

4. The powershift transmission according to claim 1, wherein the variator (V) is connectable and disconnectable from the first intermediate shaft (ZW1) by way of a separator clutch (1), and the first and the second intermediate shafts (ZW1, ZW2) are connectable in a rotationally fixed manner to and disconnectable from one another, either directly or indirectly, by way of a bridging clutch (J).

5. The powershift transmission according to claim 4, wherein the separator clutch (I) and the bridging clutch (J) are combined in a dual shifting element (S5).

6. The powershift transmission according to claim 1, wherein the main separator clutches (CL1, CL2) are unsynchronized claw clutches.

7. The powershift transmission according to claim 1, wherein the main separator clutches (CL1', CL2') are frictionally synchronized synchronous clutches.

8. The powershift transmission according to claim 1, wherein the main separator clutches (CL1*, CL2*) are disk clutches.

9. The powershift transmission according to claim 1, wherein gear clutches (A, B, C, D, E, F, G, H) for engaging the gear steps (G1 to G7, R) are unsynchronized claw clutches.

10. The powershift transmission according to claim 1, wherein gear clutches (A' to H') for engaging the gear steps (G1 to G7, R) are frictionally synchronized synchronous clutches.

11. The powershift transmission according to claim 1, wherein the driveshaft (TW) of the drive engine (VM) is connected to the first intermediate shaft (ZW1) via a starting clutch (K).

12. The powershift transmission according to claim 1, wherein one of the two main separator clutches (CL1, CL2; CL1', CL2'; CL1*, CL2*) is a friction clutch and the other main separator clutch is a claw clutch.

13. A powershift transmission, of a motor vehicle, comprising:
two partial transmissions (TG1, TG2) each comprising a respective input shaft (GE1, GE2), each of the input shafts, on an input side, being drivingly connectable with a driveshaft (TW) of a drive engine (VM) by way of a main separator clutch (CL1, CL2; CL1', CL2'; CL1*, CL2*), and, on an output side, with a common output shaft (GA) by way of a plurality of selectively engaged gear steps (G1 to G7, R) having different gear ratios, the two input shafts (GE1, GE2), on the input side, being connectable to and disconnectable from first and second intermediate shafts (ZW1, ZW2) respectively by the respective main separator clutch (CL1, CL2; CL1′, CL2′; CL1*, CL2*), the first intermediate shaft (ZW1) being directly connectable, in a rotationally fixed manner, to the driveshaft (TW) of the drive engine (VM), the second intermediate shaft (ZW2) being in driving connection with the first intermediate shaft (ZW1) by way of a variator (V) with a continuously adjustable transmission ratio ($i_V$) and a rest transmission ratio having a value of one ($i_{V\_0}=1$), and by way of a superposition gearset (SG) with first and second input elements (E1, E2) and one output element (A0), the first input element (E1) being directly connected, in a rotationally fixed manner, to the first intermediate shaft (ZW1), the second input element (E2) being in driving connection with the first intermediate shaft (ZW1) via the variator (V), and the output element (A0) being rotationally fixedly connected to the second intermediate shaft (ZW2).

14. The powershift transmission according to claim 13, wherein the superposition gearset (SG) is a simple planetary gearset (PG) which comprises a sun gear (S), a planetary carrier (T) carrying a plurality of planetary gearwheels, and a ring gear (U), and, in the superposition gearset, the sun gear (S) is the first input element (E1), the ring gear (U) is the second input element (E2) and the planetary carrier (T) is the output element (A0).

15. The powershift transmission according to claim 13, wherein the superposition gearset (SG) is a simple planetary gearset (PG) which comprises a sun gear (S), a planetary carrier (T) carrying a plurality of planetary gearwheels, and a ring gear (U), and, in the superposition gearset, the ring gear (U) is the first input element (E1), the sun gear (S) is the second input element (E2) and the planetary carrier (T) is the output element (A0).

16. The powershift transmission according to claim 13, wherein the two main separator clutches (CL1, CL2; CL1′, CL2′; CL1*, CL2*), the first and the second intermediate shafts (ZW1, ZW2), the variator (V) and the superposition gearset (SG) are combined in a pre-assembled powershift module (LSM′).

17. The powershift transmission according to claim 13, wherein the variator (V) has an adjustment range whose highest transmission ratio ($i_{V\_max}$) corresponds to at least twice a maximum gear interval ($2*\phi_{max}$) of the gear steps (G1 to G7), and whose lowest transmission ratio ($i_{V\_min}$) corresponds to at least a reciprocal of twice the maximum gear interval ($2*\phi_{max}$) of the gear steps (G1 to G7) ($i_{V\_max} \geq 2*\phi_{max}$, $i_{V\_min} \leq 1/(2*\phi_{max})$).

18. A powershift transmission, of a motor vehicle, comprising:

two partial transmissions (TG1, TG2), each partial transmission (TG1, TG2) comprising a respective input shaft (GE1, GE2), each of the input shafts being drivingly connectable, on an input side, with a driveshaft (TW) of a drive engine (VM) by way of a main separator clutch (CL1, CL2; CL1′, CL2′; CL1*, CL2*), and on an output side, with a common output shaft (GA) by way of a plurality of selectively engaged gear steps (G1 to G7, R) having different gear ratios, the two input shafts (GE1, GE2), on the input side, being connectable to and disconnectable from respective first and second intermediate shafts (ZW1, ZW2) by way of the respective main separator clutch (CL1, CL2; CL1′, CL2′; CL1*, CL2*), the first and second intermediate shafts (ZW1, ZW2) being directly in driving connection with one another via a variator with a continuously adjustable transmission ratio ($i_V$) and a rest transmission ratio having a value of one ($i_{V\_0}=1$), the first and second intermediate shafts (ZW1, ZW2) being in driving connection with the driveshaft (TW) of the drive engine (VM) by way of a transfer box (VG) that has one input element (E0) and first and second output elements (A1, A2), the input element (E0) being connectable, in a rotationally fixed manner, to the driveshaft (TW) of the engine (VM), the first output element (A1) being rotationally fixedly connected to the first intermediate shaft (ZW1), and the second output element (A2) being rotationally fixedly connected to the second intermediate shaft (ZW2).

19. The powershift transmission according to claim 18, wherein the transfer box (VG) is a simple planetary gearset (PG) which comprises a sun gear (S), a planetary carrier (T) carrying a plurality of planetary gearwheels, and a ring gear (U), and the planetary carrier (T) is the input element (E0), the sun gear (S) is the first output element (A1) and the ring gear (U) is the second output element (A2).

20. The powershift transmission according to claim 18, wherein the transfer box (VG) is a simple planetary gearset (PG) which comprises a sun gear (S), a planetary carrier (T) carrying a plurality of planetary gearwheels, and a ring gear (U), and the planetary carrier (T) is the input element (E0), the ring gear (U) is the first output element (A1) and the sun gear (S) is the second output element (A2).

21. The powershift transmission according to claim 18, wherein the two main separator clutches (CL1, CL2; CL1′, CL2′; CL1*, CL2*), the first and second intermediate shafts (ZW1, ZW2), the variator (V) and the transfer box (VG) are combined in a pre-assembled powershift module (LSM*).

22. A method for controlling shifts in a powershift transmission which comprises first and second partial transmissions (TG1, TG2) which each have a respective input shaft (GE1, GE2), each of the input shafts is drivingly connectable, on an input side, with a driveshaft (TW) of a drive engine (VM) by way of first and second main separator clutches (CL1, CL2; CL1′, CL2′; CL1*, CL2*) respectively, and on an output side, with a common output shaft (GA) by way of a plurality of selectively engaged gear steps (G1 to G7, R) having different gear ratios, the two input shafts (GE1, GE2), on the input side, are connectable to and disconnectable from a respectively associated first and second intermediate shaft (ZW1, ZW2) by way of the respective first and second separator clutch (CL1, CL2; CL1′, CL2′; CL1*, CL2*), the first intermediate shaft (ZW1) is directly connectable, in a rotationally fixed manner, to the driveshaft (TW) of the drive engine (VM) and the second intermediate shaft (ZW2) is in driving connection, with the first intermediate shaft (ZW1), by way of a variator (V) with a continuously adjustable transmission ratio ($i_V$), and a gearshift is carried out as a powershift from an initially loaded gear (for example G4) of the first partial transmission (TG1) to a target gear (for example G5) of the second partial transmission (TG2) by the method comprising the steps of:

a) synchronizing the second main separator clutch (CL2, CL2′, CL2*) by adjusting the transmission ratio of the variator (V), b) engaging the second main separator clutch (CL2, CL2', CL2*),
c) synchronizing a gear clutch (F, F') of the target gear (G5) by adjusting the transmission ratio of the variator (V),
d) engaging the gear clutch (F, F') of the target gear (G5),
e) taking up load, via the second partial transmission (TG2), by slightly adjusting the transmission ratio of the variator (V),
f) disengaging the first main separator clutch (CL1, CL1', CL1*),
g) disengaging a gear clutch (B, B') of the initially loaded gear (G4), and
h) adapting the rotational speed of the drive engine (VM) and, at the same time, resetting the variator (V) to a rest transmission ratio ($i_{V\_0}=1$).

23. The method according to claim 22, wherein a gearshift is carried out as a powershift from an initially loaded gear (for example G5) of the second partial transmission (TG2) to a target gear (for example G6) of the first partial transmission (TG1) by the method further comprising the steps of:
   i) synchronizing the first main separator clutch (CL1, CL1', CL1*) by adjusting the transmission ratio of the variator (V) and, at the same time, adapting the rotational speed of the drive engine (VM),
   j) engaging the first main separator clutch (CL1, CL1', CL1*),
   k) synchronizing the gear clutch (A, A') of the target gear (G6) by adjusting the transmission ratio of the variator (V) and, at the same time, adapting the rotational speed of the drive engine (VM),
   l) engaging the gear clutch (A, A') of the target gear (G6),
   m) taking up the load with the first partial transmission (TG1) by virtue of a slight transmission ratio adjustment of the variator (V),
   n) disengaging the second main separator clutch (CL2, CL2', CL2*),
   o) disengaging the gear clutch (F, F') of the initially loaded gear (G5), and
   p) resetting the variator (V) to the rest transmission ratio ($i_{V\_0}=1$).

24. The method according to claim 22, further comprising the steps of, outside of shifting processes, decoupling the variator (V) by disengaging a separator clutch (I) arranged between the variator and the first intermediate shaft (ZW1), and
   bridging across the variator by engaging a bridging clutch (J) arranged either directly or indirectly between the two intermediate shafts (ZW1, ZW2).

25. A method for controlling shifts in a powershift transmission, comprising two partial transmissions (TG1, TG2) each with a respective input shaft (GE1, GE2), each of the input shafts is drivingly connectable, on an input side by way of a main separator clutch (CL1, CL2; CL1', CL2'; CL1*, CL2*) with a driveshaft (TW) of a drive engine (VM), and on an output side by way of a plurality of selectively engaged gear steps (G1 to G7, R) having different gear ratios, with a common output shaft (GA), wherein by way of the respective main separator clutch (CL1, CL2; CL1', CL2'; CL1*, CL2*) the two input shafts (GE1, GE2) on the input side are connectable to and disconnectable from a respectively associated intermediate shaft (ZW1, ZW2) and the two intermediate shafts (ZW1, ZW2) are directly in driving connection with one another via a variator (V) with a continuously adjustable transmission ratio ($i_V$) and are in driving connection with the driveshaft (TW) of the drive engine (VM) via a transfer box (VG) having an input element (E0) and two output elements (A1, A2), wherein carrying out a gearshift as a powershift from a loaded gear (for example G3) of one partial transmission (for example TG2) to a target gear (for example G2) of the other partial transmission (for example TG1) with the method comprising the steps of:
   q) synchronizing the main separator clutch (CL1, CL1', CL1*) of the other partial transmission (TG1) by adjusting the transmission ratio of the variator (V) and, at the same time, adapting the rotational speed of the drive engine (VM),
   r) engaging the main separator clutch (CL1, CL1', CL1*) of the other partial transmission (TG1),
   s) synchronizing the gear clutch (C, C') of the target gear (G2) by adjusting the transmission ratio of the variator (V) and, at the same time, adapting the rotational speed of the drive engine (VM),
   t) engaging the gear clutch (C, C') of the target gear (G2),
   u) taking up the load with the other partial transmission (TG1) by virtue of a slight transmission ratio adjustment of the variator (V),
   v) disengaging the main separator clutch (CL2, CL2', CL2*) of the one partial transmission (TG2),
   w) disengaging the gear clutch (G, G') of the initially loaded gear (G3), and
   x) adapting a rotational speed of the drive engine (VM) and, at the same time, resetting the variator (V) to a rest transmission ratio ($i_{V\_0}=1$).

26. A method for controlling shifts in a powershift transmission which comprises first and second partial transmissions (TG1, TG2) which each have a respective input shaft (GE1, GE2), each of the input shafts is drivingly connectable, on an input side, with a driveshaft (TW) of a drive engine (VM) by way of first and second main separator clutches (CL1, CL2; CL1', CL2'; CL1*, CL2*) respectively, and, on an output side, with a common output shaft (GA) by way of a plurality of selectively engaged gear steps (G1 to G7, R) having different gear ratios, the two input shafts (GE1, GE2), on the input side, are connectable to and disconnectable from a respectively associated first and second intermediate shaft (ZW1, ZW2) by way of the respective first and the second main separator clutches (CL1, CL2; CL1', CL2'; CL1*, CL2*), at least the second main separator clutch (CL2', CL2*) is either a frictionally synchronized synchronous clutch or a disk clutch, the first intermediate shaft (ZW1) is directly connectable, in a rotationally fixed manner, to the driveshaft (TW) of the drive engine (VM), and the second intermediate shaft (ZW2) is in driving connection, with the first intermediate shaft (ZW1), by way of a variator (V) with a continuously adjustable transmission ratio ($i_V$), and a gearshift is carried out as a powershift from an initially loaded gear (for example G4) of the first partial transmission (TG1) to a target gear (for example G5) of the second partial transmission (TG2) by the method comprising the steps of:
   a) synchronizing the second main separator clutch (CL2', CL2*) by friction elements of the second main separator clutch (CL2', CL2*),
   b) engaging the second main separator clutch (CL2, CL2', CL2*),
   c) synchronizing a gear clutch (F, F') of the target gear (G5) by adjusting the transmission ratio of the variator (V),
   d) engaging the gear clutch (F, F') of the target gear (G5),
   e) taking up load, via the second partial transmission (TG2), by adjusting the transmission ratio of the variator (V),
   f) disengaging the first main separator clutch (CL1, CL1', CL1*),
   g) disengaging a gear clutch (B, B') of the initially loaded gear (G4), and h) adapting the rotational speed of the drive engine (VM) and, at the same time, resetting the variator (V) to a rest transmission ratio ($i_{V\_0}=1$).

27. A method for controlling shifts in a powershift transmission which comprises first and second partial transmissions (TG1, TG2) which each have a respective input shaft (GE1, GE2), each of the input shafts is drivingly connectable, on an input side, with a driveshaft (TW) of a drive engine (VM) by way of first and second main separator clutches (CL1, CL2; CL1', CL2'; CL1*, CL2*) respectively, and, on an output side, with a common output shaft (GA) by way of a plurality of selectively engaged gear steps (G1 to G7, R) having different gear ratios, gear clutches (A' to H') for selectively engaging the gear steps (G1 to G7, R) are frictionally synchronized synchronous gear clutches, the two input shafts (GE1, GE2), on the input side, are connectable to and disconnectable from a respectively associated first and second intermediate shaft (ZW1, ZW2) by way of the respective first and the second main separator clutches (CL1, CL2; CL1', CL2'; CL1*, CL2*), at least the second main separator clutch (CL2', CL2*) is either a frictionally synchronized synchronous clutch or a disk clutch, the first intermediate shaft (ZW1) is directly connectable, in a rotationally fixed manner, to the driveshaft (TW) of the drive engine (VM) and the second intermediate shaft (ZW2) is in driving connection, with the first intermediate shaft (ZW1), by way of a variator (V) with a continuously adjustable transmission ratio ($i_V$), and a gearshift is carried out as a powershift from an initially loaded gear (for example G4) of the first partial transmission (TG1) to a target gear (for example G5) of the second partial transmission (TG2) by the method comprising the steps of:

a) synchronizing a gear clutch (F') of the target gear (G5) by friction elements of the gear clutch (F') of the target gear, b) engaging the gear clutch (F') of the target gear (G5), c) synchronizing the second main separator clutch (CL2, CL2', CL2*) by adjusting the transmission ratio of the variator (V), d) engaging the second main separator clutch (CL2, CL2', CL2*)

e) taking up load, via the second partial transmission (TG2), by adjusting the transmission ratio of the variator (V), f) disengaging the first main separator clutch (CL1, CL1', CL1*), g) disengaging a gear clutch (B, B') of the initially loaded gear (G4), and h) adapting the rotational speed of the drive engine (VM) and, at the same time, resetting the variator (V) to a rest transmission ratio ($i_{V\_0}=1$).

28. A method for controlling shifts in a powershift transmission which comprises first and second partial transmissions (TG1, TG2) which each have a respective input shaft (GE1, GE2), each of the input shafts is drivingly connectable, on an input side, with a driveshaft (TW) of a drive engine (VM) by way of first and second main separator clutches (CL1, CL2; CL1', CL2'; CL1*, CL2*) respectively, and, on an output side, with a common output shaft (GA) by way of a plurality of selectively engaged gear steps (G1 to G7, R) having different gear ratios, the two input shafts (GE1, GE2), on the input side, are connectable to and disconnectable from a respectively associated first and second intermediate shaft (ZW1, ZW2) by way of the respective first and the second main separator clutches (CL1, CL2; CL1', CL2'; CL1*, CL2*), at least the first main separator clutch (CL1', CL1*) is either a frictionally synchronized synchronous clutch or a disk clutch, the first intermediate shaft (ZW1) is directly connectable, in a rotationally fixed manner, to the driveshaft (TW) of the drive engine (VM) and the second intermediate shaft (ZW2) is in driving connection, with the first intermediate shaft (ZW1), by way of a variator (V) with a continuously adjustable transmission ratio ($i_V$), and a gearshift is carried out as a powershift from an initially loaded gear (for example G4) of the first partial transmission (TG1) to a target gear (for example G5) of the second partial transmission (TG2), and a gearshift is carried out as a powershift from the target gear (for example G5) of the second partial transmission (TG2) to a target gear (for example G6) of the first partial transmission (TG1) by the method comprising the steps of:

a) synchronizing the second main separator clutch (CL2, CL2', CL2*) by adjusting the transmission ratio of the variator (V), b) engaging the second main separator clutch (CL2, CL2', CL2*), c) synchronizing a gear clutch (F, F') of the target gear (G5) of the second partial transmission by adjusting the transmission ratio of the variator (V), d) engaging the gear clutch (F, F') of the target gear (G5) of the second partial transmission, e) taking up load, via the second partial transmission (TG2), by adjusting the transmission ratio of the variator (V), f) disengaging the first main separator clutch (CL1, CL1', CL1*), g) disengaging a gear clutch (B, B') of the initially loaded gear (G4) of the first partial transmission, and h) adapting the rotational speed of the drive engine (VM) and, at the same time, resetting the variator (V) to a rest transmission ratio ($i_{V\_0}=1$), i) synchronizing the first main separator clutch (CL1', CL1*) by friction elements of the first main separator clutch (CL1', CL1*), j) engaging the first main separator clutch (CL1, CL1', CL1*), k) synchronizing a gear clutch (A, A') of the target gear (G6) of the first partial transmission by adjusting the transmission ratio of the variator (V) and, at the same time, adapting the rotational speed of the drive engine (VM), l) engaging the gear clutch (A, A') of the target gear (G6) of the first partial transmission, m) taking up the load with the first partial transmission (TG1) by virtue of a transmission ratio adjustment of the variator (V), n) disengaging the second main separator clutch (CL2, CL2', CL2*), o) disengaging the gear clutch (F, F') of the target gear (G5) of the second partial transmission, and p) resetting the variator (V) to the rest transmission ratio ($i_{V\_0}=1$).

29. A method for controlling shifts in a powershift transmission which comprises first and second partial transmissions (TG1, TG2) which each have a respective input shaft (GE1, GE2), each of the input shafts is drivingly connectable, on an input side, with a driveshaft (TW) of a drive engine (VM) by way of first and second main separator clutches (CL1, CL2; CL1', CL2'; CL1*, CL2*) respectively, and, on an output side, with a common output shaft (GA) by way of a plurality of selectively engaged gear steps (G1 to G7, R) having different gear ratios, gear clutches (A' to H') for engaging the gear steps (G1 to G7, R) are frictionally synchronized synchronous clutches, the two input shafts (GE1, GE2), on the input side, are connectable to and disconnectable from a respectively associated first and second intermediate shaft (ZW1, ZW2) by way of the respective first and the second main separator clutches (CL1, CL2; CL1', CL2'; CL1*, CL2*), the first intermediate shaft (ZW1) is directly connectable, in a rotationally fixed manner, to the driveshaft (TW) of the drive engine (VM) and the second intermediate shaft (ZW2) is in driving connection, with the first intermediate shaft (ZW1), by way of a variator (V) with a continuously adjustable transmission ratio ($i_V$), and a gearshift is carried out as a powershift from an initially loaded gear (for example G4) of the first partial transmission (TG1) to a target gear (for example G5) of the second partial transmission (TG2), and a gearshift is carried out as a powershift from the target gear (for example G5) of the second partial transmission (TG2) to a target gear (for example G6) of the first partial transmission (TG1) by the method comprising the steps of:
  a) synchronizing the second main separator clutch (CL2, CL2', CL2*) by adjusting the transmission ratio of the variator (V),
  b) engaging the second main separator clutch (CL2, CL2', CL2*),
  c) synchronizing a gear clutch (F, F') of the target gear (G5) of the second partial transmission by adjusting the transmission ratio of the variator (V),
  d) engaging the gear clutch (F, F') of the target gear (G5) of the second partial transmission,
  e) taking up load, via the second partial transmission (TG2), by adjusting the transmission ratio of the variator (V),
  f) disengaging the first main separator clutch (CL1, CL1', CL1*),
  g) disengaging a gear clutch (B, B') of the initially loaded gear (G4) of the first partial transmission,
  h) adapting the rotational speed of the drive engine (VM) and, at the same time, resetting the variator (V) to a rest transmission ratio ($i_{V\_0}=1$),
  i) synchronizing a gear clutch (A') of the target gear (G6) of the first partial transmission by the friction elements of the gear clutch (A') of the target gear (G6) of the first partial transmission,
  j) engaging the gear clutch (A') of the target gear (G6) of the first partial transmission,
  k) synchronizing the first main separator clutch (CL1, CL1', CL1*) by adjusting the transmission ratio of the variator (V) and, at the same time, adapting the rotational speed of the drive engine (VM),
  i) engaging the first main separator clutch (CL1, CL1', CL1*),
  m) taking up the load with the first partial transmission (TG1) by virtue of a transmission ratio adjustment of the variator (V),
  n) disengaging the second main separator clutch (CL2, CL2', CL2*),
  o) disengaging the gear clutch (F, F') of the target gear (G5) of the second partial transmission, and
  p) resetting the variator (V) to the rest transmission ratio ($i_{V\_0}=1$).

30. A method for controlling shifts in a powershift transmission, comprising two partial transmissions (TG1, TG2) each with a respective input shaft (GE1, GE2), each of the input shafts is drivingly connectable, on an input side, by way of a respective main separator clutch (CL1, CL2; CL1', CL2': CL1*, CL2*) with a driveshaft (TW) of a drive engine (VM), and, on an output side, by way of a plurality of selectively engaged gear steps (G1 to G7, R) having different gear ratios, with a common output shaft (GA), wherein by way of the respective main separator clutches (CL1, CL2; CL1', CL2'; CL1*, CL2*) the two input shafts (GE1, GE2) on the input side are connectable to and disconnectable from a respectively associated intermediate shaft (ZW1, ZW2) and the two intermediate shafts (ZW1, ZW2) are directly in driving connection with one another via a variator (V) with a continuously adjustable transmission ratio ($i_V$) and are in driving connection with the driveshaft (TW) of the drive engine (VM) via a transfer box (VG) having an input element (E0) and two output elements (A1, A2), at least the main separator clutch (for example CL1', CL1*) of a first of the two partial transmissions (for example TG1) is either a frictionally synchronized synchronous clutch or a disk clutch, wherein carrying out a gearshift as a powershift from a loaded gear (for example G3) of a second of the two partial transmissions (for example TG2) to a target gear (for example G2) of the first partial transmission (for example TG1) with the method comprising the steps of:
  q) synchronizing the main separator clutch (CL1', CL1*) of the first partial transmission (TG1) by friction elements of the main separator clutch (CL1', CL1*) of the first partial transmission (TG1),
  r) engaging the main separator clutch (CL1, CL1', CL1*) of the first partial transmission (TG1),
  s) synchronizing a gear clutch (C, C') of the target gear (G2) of the first partial transmission by adjusting the transmission ratio of the variator (V) and, at the same time, adapting the rotational speed of the drive engine (VM),
  t) engaging the gear clutch (C, C') of the target gear (G2) of the first partial transmission,
  u) taking up the load with the first partial transmission (TG1) by virtue of a transmission ratio adjustment of the variator (V),
  v) disengaging the main separator clutch (CL2, CL2', CL2*) of the second partial transmission (TG2),
  w) disengaging a gear clutch (G, G') of the loaded gear (G3) of the second partial transmission, and
  x) adapting a rotational speed of the drive engine (VM) and, at the same time, resetting the variator (V) to a rest transmission ratio ($i_{V\_0}=1$).

31. A method for controlling shifts in a powershift transmission, comprising two partial transmissions (TG1, TG2) each with a respective input shaft (GE1, GE2), each of the input shafts is drivingly connectable, on an input side, by way of a respective main separator clutch (CL1, CL2; CL1', CL2'; CL1*, CL2*) with a driveshaft (TW) of a drive engine (VM), and, on an output side, by way of a plurality of selectively engaged gear steps (G1 to G7, R) having different gear ratios, with a common output shaft (GA), wherein by way of the respective main separator clutches (CL1, CL2; CL1', CL2'; CL1*, CL2*) the two input shafts (GE1, GE2) on the input side are connectable to and disconnectable from a respectively associated intermediate shaft (ZW1, ZW2) and the two intermediate shafts (ZW1, ZW2) are directly in driving connection with one another via a variator (V) with a continuously adjustable transmission ratio ($i_V$) and are in driving connection with the driveshaft (TW) of the drive engine (VM) via a transfer box (VG) having an input element (E0) and two output elements (A1, A2), gear clutches (A' to H') for engaging the gear steps (G1 to G7, R) are frictionally synchronized synchronous clutches, wherein carrying out a gearshift as a powershift from a loaded gear (for example G3) of a second of the two partial transmissions (for example TG2) to a target gear (for example G2) of a first of the two partial transmission (for example TG1) with the method comprising the steps of:
  q) synchronizing a gear clutch (C') of the target gear (G2) of the first partial transmission by friction elements of the gear clutch (C') of the target gear (G2) of the first partial transmission, r) engaging the gear clutch (C') of the target gear (G2) of the first partial transmission,
s) synchronizing the main separator clutch (CL1, CL1', CL1*) of the other partial transmission (TG1) by adjusting the transmission ratio of the variator (V) and, at the same time, adapting the rotational speed of the drive engine (VM),
t) engaging the main separator clutch (CL1, CL1', CL1*) of the first partial transmission (TG1),
u) taking up the load with the first partial transmission (TG1) by virtue of a transmission ratio adjustment of the variator (V),
v) disengaging the main separator clutch (CL2, CL2', CL2*) of the second partial transmission (TG2),
w) disengaging the gear clutch (G, G') of the loaded gear (G3) of the second partial transmission, and
x) adapting a rotational speed of the drive engine (VM) and, at the same time, resetting the variator (V) to a rest transmission ratio ($i_{V\_0}=1$).

* * * * *